(12) United States Patent
Kamei et al.

(10) Patent No.: US 11,009,348 B2
(45) Date of Patent: May 18, 2021

(54) STRUCTURE MEASURING DEVICE, MEASUREMENT POINT CORRECTING DEVICE, AND MEASUREMENT POINT CORRECTING METHOD

(71) Applicant: Mitsubishi Electric Corporation, Tokyo (JP)

(72) Inventors: Katsuyuki Kamei, Tokyo (JP); Masashi Watanabe, Tokyo (JP); Hiroyuki Fujibayashi, Tokyo (JP); Megumi Irie, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/622,984

(22) PCT Filed: Jul. 31, 2017

(86) PCT No.: PCT/JP2017/027657
§ 371 (c)(1),
(2) Date: Dec. 16, 2019

(87) PCT Pub. No.: WO2019/026114
PCT Pub. Date: Feb. 7, 2019

(65) Prior Publication Data
US 2020/0149885 A1    May 14, 2020

(51) Int. Cl.
*G01C 7/04*     (2006.01)
*G01B 11/25*    (2006.01)
(Continued)

(52) U.S. Cl.
CPC ............... *G01C 7/04* (2013.01); *G01B 11/25* (2013.01); *G01B 11/303* (2013.01); *G01C 22/00* (2013.01);
(Continued)

(58) Field of Classification Search
CPC ..... G01B 11/002; G01B 11/245; G01B 11/25; G01B 11/30; G01B 11/303; G01C 7/04; G01C 7/06; G01C 15/002; G01S 17/89
See application file for complete search history.

(56) References Cited

U.S. PATENT DOCUMENTS 3,950,096 A * 4/1976 Aeschlimann ......... G01B 11/24
356/3.05
4,179,216 A * 12/1979 Theurer ................... B61K 9/00
33/338
(Continued)

FOREIGN PATENT DOCUMENTS

DE  102004048637 A1   4/2006
JP    2005069700 A    3/2005
(Continued)

OTHER PUBLICATIONS

Extended European Search Report dated Aug. 11, 2020 for corresponding European patent application No. 17919677.9, 11 pages.
(Continued)

*Primary Examiner* — Michael A Lyons
(74) *Attorney, Agent, or Firm* — Buchanan Ingersoll & Rooney PC

(57) ABSTRACT

The interior of a first measurement surface and the interior of a second measurement surface traveling together with a measuring vehicle are scanned to acquire first measurement coordinate points and second measurement coordinate points, respectively. A first comparison point cloud representing a comparison part on a surface of a structure is extracted from the first measurement coordinate points. A second comparison point cloud representing a comparison part on the surface of the structure is extracted from the second measurement coordinate points. A difference between the first comparison point cloud and the second comparison point cloud corresponding to measurement of a
(Continued)

common comparison part on the surface of the structure is calculated. Error having time dependence included in the first measurement coordinate points and the second measurement coordinate points is calculated on the basis of the calculated difference. The measurement coordinate points are corrected on the basis of the calculated error.

15 Claims, 23 Drawing Sheets

(51) Int. Cl.
    *G01B 11/30*     (2006.01)
    *G01C 22/00*     (2006.01)
    *G01P 3/00*     (2006.01)
    *G01P 15/02*     (2013.01)
    *G01S 19/01*     (2010.01)

(52) U.S. Cl.
    CPC ................ *G01P 3/00* (2013.01); *G01P 15/02* (2013.01); *G01S 19/01* (2013.01)

(56) References Cited

U.S. PATENT DOCUMENTS

| | | | | |
|---|---|---|---|---|
| 4,180,322 A | * | 12/1979 | Farcinade | G01C 7/06 246/1 R |
| 2006/0274930 A1 | * | 12/2006 | Laurent | G01N 21/8901 382/141 |
| 2010/0034426 A1 | * | 2/2010 | Takiguchi | G01C 21/3602 382/106 |

FOREIGN PATENT DOCUMENTS

| | | |
|---|---|---|
| JP | 2012002783 A | 1/2012 |
| JP | 2016206131 A | 12/2016 |

OTHER PUBLICATIONS

International Search Report (PCT/ISA/210), with translation, and Written Opinion (PCT/ISA/237) dated Oct. 3, 2017, by the Japan Patent Office as the International Searching Authority for International Application No. PCT/JP2017/027657.

* cited by examiner

F I G. 8
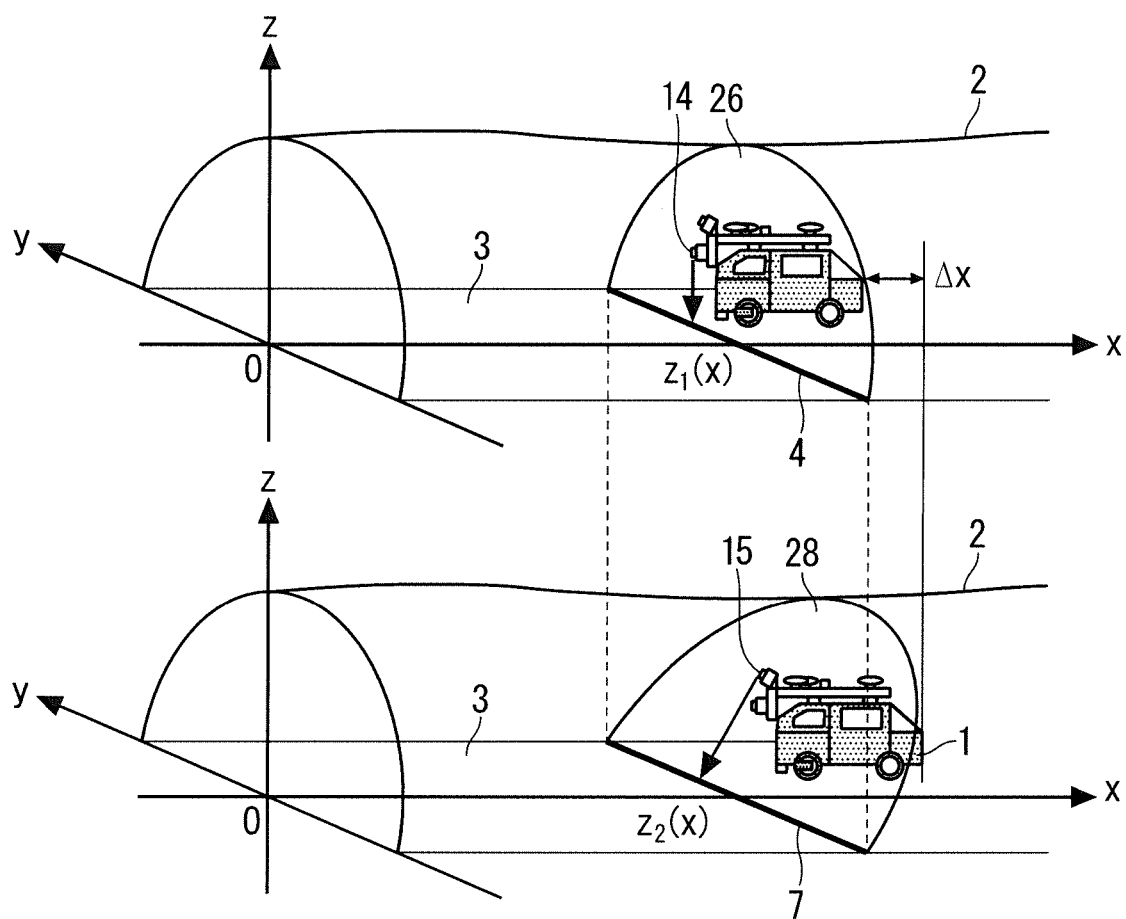

STRUCTURE MEASURING DEVICE, MEASUREMENT POINT CORRECTING DEVICE, AND MEASUREMENT POINT CORRECTING METHOD

TECHNICAL FIELD

The present invention relates to a structure measuring device, a measurement point correcting device, and a measurement point correcting method. The present invention particularly relates to a structure measuring device that measures the geometry of a surface of a structure, a measurement point correcting device that corrects a measurement coordinate point indicating the geometry of the surface of the structure, and a measurement point correcting method that correct the measurement coordinate point indicating the geometry of the surface of the structure.

BACKGROUND ART

For safety check on structures existing along routes such as roads and tracks and structures installed on such structures, situations of unevenness on surfaces of these structures at some point in time or situations of changes in such unevenness after passage of time are required to be measured in detail over a long route. More specifically, measurement surfaces of structures such as roads, tracks, tunnels, bridges, and columnar grounding objects is required. Referring particularly to tunnels, as a result of a great number of tunnels and their long total distances, an efficient checking method is particularly required. For this measurement, a method called mobile mapping system (MMS) by means of measurement using a mobile unit has been suggested. For example, the following techniques have been suggested.

According to Japanese Patent Application Laid-Open No. 2016-206131 (patent document 1), a road is measured by the MMS using a measuring vehicle provided with a laser scanner and traveling on the road. The laser scanner emits a laser beam, measures a distance to a point where the emitted laser beam is reflected, and generates scan data containing the measured distance. Three-dimensional point cloud data indicating the geometry of the road is generated using the scan data and a ground position of the measuring vehicle determined at the time of acquisition of the scan data. The foregoing document points out that, while the measuring accuracy of the MMS depends on the accuracy of a ground position, the impossibility to use a global positioning system (GPS) in tunnels makes it difficult to increase the measuring accuracy of the MMS. In this regard, according to the technique disclosed in the foregoing document, during measurement of roads and tunnels, transverse scan data acquired by scanning the roads and the tunnels in a transverse direction is corrected using road surface longitudinal scan data. The road surface longitudinal scan data is measured by a road surface longitudinal laser scanner and contains position information about each of multiple road surface longitudinal points aligned in a longitudinal direction of the roads and the tunnels. The road surface longitudinal point is a point where a laser beam emitted from the road surface longitudinal laser scanner is reflected.

According to a technique of Japanese Patent Application Laid-Open No. 2012-2783 (patent document 2), an encoder for detecting a position coordinate, and a first sensor and an second sensor for outputting measured distance data are moved by a vehicle in an axis direction of a tubular body such as a tunnel. The first sensor scans a laser beam in a vertical direction. The second sensor scans a laser beam in a direction tilted to a predetermined angle from the vertical direction. On the basis of measured distance data acquired by the first and second sensors, the axis of the tubular body and a tilt angle of the vehicle are calculated. The position coordinate detected by the encoder is corrected on the basis of the calculated tilt angle. Using data detected in advance by the first and second sensors when a tilt from the axis of the tubular body is zero as a reference value, this tilt angle is calculated on the basis of an amount of change from the reference value.

Japanese Patent Application Laid-Open No. 2005-69700 (patent document 3) discloses a three-dimensional data acquisition device. This device includes a first laser scanner installed on a railway vehicle in such a manner that a measurement section forms a vertical plane relative to a traveling direction of the railway vehicle, and a second laser scanner installed on the railway vehicle in such a manner as to form a measurement section pointed upward by a predetermined angle relative to the former measurement section. This document suggests use of data resulting from averaging of data from the first and second laser scanners about the same subject.

PRIOR ART DOCUMENTS

Patent Documents

Patent document 1: Japanese Patent Application Laid-Open No. 2016-206131
Patent document 2: Japanese Patent Application Laid-Open No. 2012-2783
Patent document 3: Japanese Patent Application Laid-Open No. 2005-69700

SUMMARY

Problem to be Solved by the Invention

According to the technique of the foregoing patent document 1, a measurement region expressed by the road surface longitudinal scan data used for correction does not have an extension in the width direction of the roads and the tunnels. With such limited data, making correction with high accuracy may be difficult.

The technique of the foregoing patent document 2 requires data detected when a tilt angle between the axis of the tubular body and the vehicle is zero. Acquiring such data is generally considered to be difficult.

The technique of the foregoing patent document 3 suggests averaging of data from the first and second laser scanners. However, merely calculating an average can reduce measurement error only to a limited level.

As described above, correcting measurement error sufficiently is difficult by the foregoing conventional techniques. One of major reasons for causing measurement error is that at least one of information about the position and information about the attitude of a vehicle cannot be acquired with sufficient accuracy at the time of making each measurement on a surface using a laser scanner, for example. The surface is generally measured in a very short cycle, so that information about the position and attitude of the vehicle is almost always required to be maintained at high accuracy. However, undulations such as joints, pavement boundaries, repairing traces, partial depressions, and coating (white lines and those for road markings) exist on a road surface. If a vehicle is influenced by such undulations to vibrate, the position and attitude of the vehicle may be changed. This makes it difficult to recognize information about the position and attitude of the vehicle with high accuracy at all times. Additionally, the position and attitude of the vehicle are generally measured only intermittently. Hence, even if the position and attitude of the vehicle are measured with high accuracy, the position and attitude of the vehicle in moments other than the moments of such intermittent measurement should be estimated by allowing for a certain degree of error.

It is assumed, for example, that an inertial sensor for acquiring information about the position and attitude of a vehicle makes measurement in a cycle of 0.1 seconds. In this case, if the speed of the vehicle is 40 km per hour, the position and attitude of the vehicle can be measured only at intervals of about one-meter travel of the vehicle. Hence, estimating the position and attitude of the vehicle by allowing for a certain degree of error becomes unavoidable for measuring unevenness of a structure with accuracy of less than 1 m. This estimation is required for maintenance and management of a tunnel for which consideration is generally required to be given to displacement on a lining surface (inner wall) (deformation of unevenness) in units of millimeters, for example. Meanwhile, the size of the foregoing undulations on a road surface is often about 1 cm or more. Hence, disturbances of the position and attitude of the vehicle due to the undulations on the road surface also occur at a magnitude of 1 cm or more. As a result, in making measurement of unevenness of a structure in a range of about 1 m on a route, unevenness of about 1 cm or more inherently absent on the route is unavoidably developed.

The present invention has been made to solve the foregoing problem, and is intended to provide a structure measuring device, a measurement point correcting device, and a measurement point correcting method capable of measuring the situation of unevenness on a surface of a structure with high accuracy through measurement from a vehicle.

Means to Solve the Problem

A structure measuring device according to the present invention is to measure the geometry of a surface of a structure around a measuring vehicle. The structure measuring device comprises a position and attitude sensor, a first point cloud sensor, a second point cloud sensor, a measurement coordinate point calculating unit, a storage unit, a comparison part extracting unit, a difference calculating unit, an error calculating unit, and a coordinate value correcting unit. The position and attitude sensor senses the position and attitude of the measuring vehicle. The first point cloud sensor senses relative positions of multiple first measurement points from the measuring vehicle by scanning the interior of a first measurement surface traveling together with the measuring vehicle. The second point cloud sensor senses relative positions of multiple second measurement points from the measuring vehicle by scanning the interior of a second measurement surface traveling together with the measuring vehicle and differing from the first measurement surface. The measurement coordinate point calculating unit calculates multiple first measurement coordinate points forming a three-dimensional point cloud representing the multiple first measurement points on the basis of the relative positions of the multiple first measurement points sensed by the first point cloud sensor and an estimated position and attitude the measuring vehicle has at a time when each of the multiple first measurement points is sensed. Further, the measurement coordinate point calculating unit calculates multiple second measurement coordinate points forming a three-dimensional point cloud representing the multiple second measurement points on the basis of the relative positions of the multiple second measurement points sensed by the second point cloud sensor and an estimated position and attitude the measuring vehicle has at a time when each of the multiple second measurement points is sensed. The storage unit stores the multiple first measurement coordinate points and the multiple second measurement coordinate points together with respective measurement times. The comparison part extracting unit extracts a first comparison point cloud representing a comparison part on the surface of the structure from the multiple first measurement coordinate points stored in the storage unit. Further, the comparison part extracting unit extracts a second comparison point cloud representing a comparison part on the surface of the structure from the multiple second measurement coordinate points stored in the storage unit. The difference calculating unit calculates a difference between the first comparison point cloud and the second comparison point cloud corresponding to measurement of a common comparison part on the surface of the structure. The error calculating unit calculates error having time dependence included in the multiple first measurement coordinate points and the multiple second measurement coordinate points on the basis of the difference calculated by the difference calculating unit. The coordinate value correcting unit corrects at least either the multiple first measurement coordinate points or the multiple second measurement coordinate points on the basis of the error calculated by the error calculating unit.

A measurement point correcting device according to the present invention is to correct at least either multiple first measurement coordinate points or multiple second measurement coordinate points indicating the geometry of a surface of a structure acquired by scanning the interior of a first measurement surface and scanning the interior of a second measurement surface, respectively. The first measurement surface and the second measurement surface maintain a relative positional relationship and travel together. The measurement point correcting device comprises a comparison part extracting unit, a difference calculating unit, an error calculating unit, and a coordinate value correcting unit. The comparison part extracting unit extracts a first comparison point cloud representing a comparison part on the surface of the structure from the multiple first measurement coordinate points. Further, the comparison part extracting unit extracts a second comparison point cloud representing a comparison part on the surface of the structure from the multiple second measurement coordinate points. The difference calculating unit calculates a difference between the first comparison point cloud and the second comparison point cloud corresponding to measurement of a common comparison part on the surface of the structure. The error calculating unit calculates error having time dependence included in the multiple first measurement coordinate points and the multiple second measurement coordinate points on the basis of the difference calculated by the difference calculating unit. The coordinate value correcting unit corrects at least either the multiple first measurement coordinate points or the multiple second measurement coordinate points on the basis of the error calculated by the error calculating unit.

A measurement point correcting method according to the present invention is to correct at least either multiple first measurement coordinate points or multiple second measurement coordinate points indicating the geometry of a surface of a structure acquired by scanning the interior of a first measurement surface and scanning the interior of a second measurement surface, respectively. The first measurement surface and the second measurement surface maintain a relative positional relationship and travel together. The method comprises the following steps. A first comparison point cloud representing a comparison part on the surface of the structure is extracted from the multiple first measurement coordinate points, and a second comparison point cloud representing a comparison part on the surface of the structure is extracted from the multiple second measurement coordinate points. A difference between the first comparison point cloud and the second comparison point cloud corresponding to measurement of a common comparison part on the surface of the structure is calculated. Error having time dependence included in the multiple first measurement coordinate points and the multiple second measurement coordinate points is calculated on the basis of the difference. At least either the multiple first measurement coordinate points or the multiple second measurement coordinate points are corrected on the basis of the error.

Effects of the Invention

According to the structure measuring device of the present invention, the common comparison part on the surface of the structure is recognized as the first comparison point cloud on the first measurement surface at a first time and is recognized as the second comparison point cloud on the second measurement surface at a second time. Then, a difference between the first comparison point cloud and the second comparison point cloud corresponding to the common comparison part is calculated. The respective coordinates of the first comparison point cloud and the second comparison point cloud are determined with measurement error at the first time and measurement error at the second time, respectively, relative to a true coordinate of the sensed comparison part. Thus, data about the difference between the first comparison point cloud and the second comparison point cloud indicates a difference between the measurement error at the first time and the measurement error at the second time. If the speed of the measuring vehicle is known, a shift between the first time and the second time is also known. In this way, by using the data about the difference between the first comparison point cloud and the second comparison point cloud, it becomes possible to know a difference between measurement error at a particular time and measurement error at a time shifted from the particular time by a known length of time. As a result, the time dependence of the measurement error can be known on the basis of the data about the time dependence of the difference between the first comparison point cloud and the second comparison point cloud. By correcting the measurement error known in this way, the measurement coordinate points indicating the geometry of the surface of the structure can be given higher accuracy.

According to the measurement point correcting device of the present invention, while the common comparison part on the surface of the structure is recognized as the first comparison point cloud on the first measurement surface at a first time and is recognized as the second comparison point cloud on the second measurement surface at a second time, a difference between the first comparison point cloud and the second comparison point cloud corresponding to the common comparison part is calculated. The respective coordinates of the first comparison point cloud and the second comparison point cloud are determined with measurement error at the first time and measurement error at the second time, respectively, relative to a true coordinate of the sensed comparison part. Thus, data about the difference between the first comparison point cloud and the second comparison point cloud indicates a difference between the measurement error at the first time and the measurement error at the second time. If the speed of the measuring vehicle is known, a shift between the first time and the second time is also known. In this way, by using the data about the difference between the first comparison point cloud and the second comparison point cloud, it becomes possible to know a difference between measurement error at a particular time and measurement error at a time shifted from the particular time by a known length of time. As a result, the time dependence of the measurement error can be known on the basis of the data about the time dependence of the difference between the first comparison point cloud and the second comparison point cloud. By correcting the measurement error known in this way, the measurement coordinate points indicating the geometry of the surface of the structure can be given higher accuracy.

According to the measurement point correcting method of the present invention, while the common comparison part on the surface of the structure is recognized as the first comparison point cloud on the first measurement surface at a first time and is recognized as the second comparison point cloud on the second measurement surface at a second time, a difference between the first comparison point cloud and the second comparison point cloud corresponding to the common comparison part is calculated. The respective coordinates of the first comparison point cloud and the second comparison point cloud are determined with measurement error at the first time and measurement error at the second time, respectively, relative to a true coordinate of the sensed comparison part. Thus, data about the difference between the first comparison point cloud and the second comparison point cloud indicates a difference between the measurement error at the first time and the measurement error at the second time. If the speed of the measuring vehicle is known, a shift between the first time and the second time is also known. In this way, by using the data about the difference between the first comparison point cloud and the second comparison point cloud, it becomes possible to know a difference between measurement error at a particular time and measurement error at a time shifted from the particular time by a known length of time. As a result, the time dependence of the measurement error can be known on the basis of the data about the time dependence of the difference between the first comparison point cloud and the second comparison point cloud. By correcting the measurement error known in this way, the measurement coordinate points indicating the geometry of the surface of the structure can be given higher accuracy.

These and other objects, features, aspects and advantages of the present invention will become more apparent from the following detailed description of the present invention when taken in conjunction with the accompanying drawings.

BRIEF DESCRIPTION OF DRAWINGS

FIG. 8 is a perspective view explaining operations in the tunnel of the first and second point cloud sensors belonging to the structure measuring device according to the first embodiment of the present invention;

DESCRIPTION OF EMBODIMENT(S)

Figure 1:
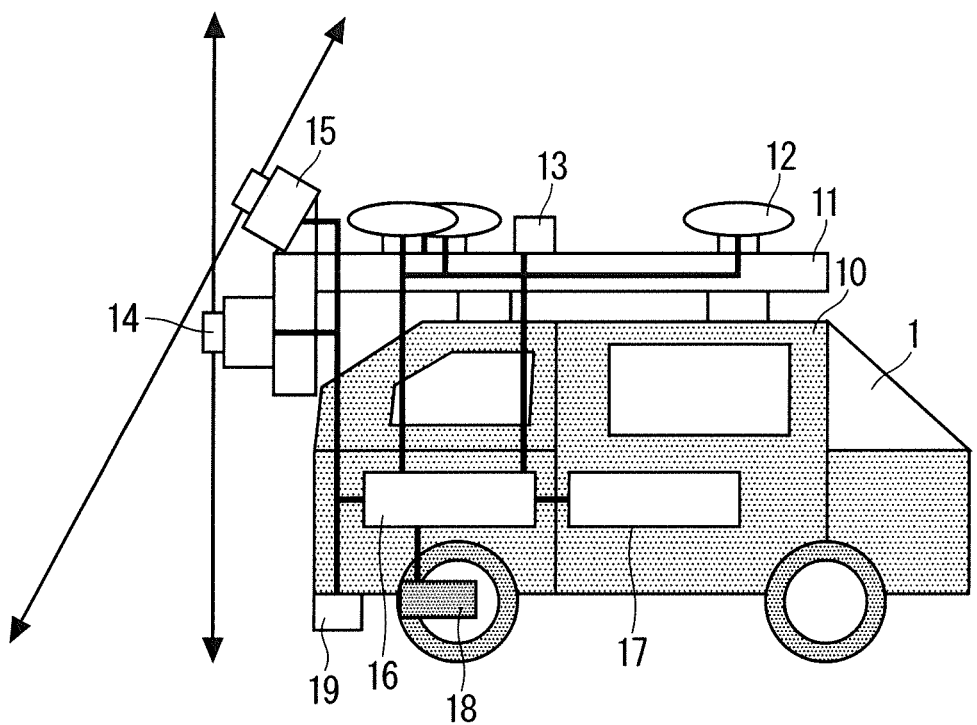
FIG. 1 is a side view showing an example of the configuration of a measuring vehicle provided with a structure measuring device according to a first embodiment of the present invention.

Embodiments of the present invention will be described below on the basis of the drawings. Corresponding or comparable parts in the drawings referred to in the following description are given the same reference sign and will not be described repeatedly.

First Embodiment (Outline of Configuration)

Figure 2:
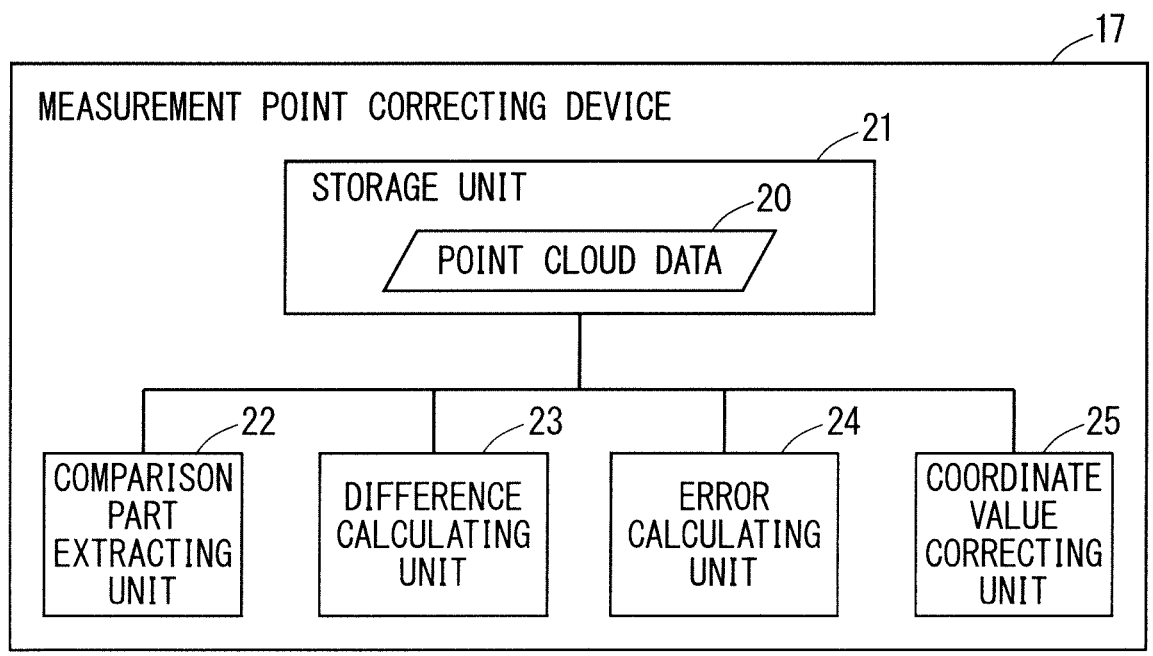
FIG. 2 is a block diagram schematically showing the configuration of a measurement point correcting device belonging to the structure measuring device according to the first embodiment of the present invention.
Figure 3:
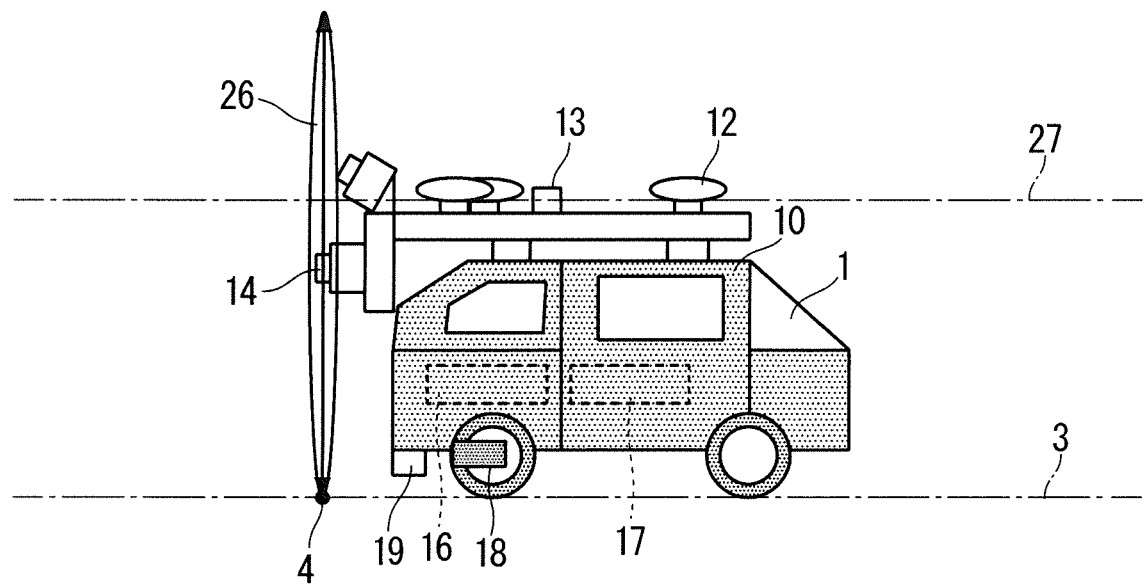
FIG. 3 is a side view explaining a first point cloud sensor belonging to the structure measuring device according to the first embodiment of the present invention.
Figure 4:
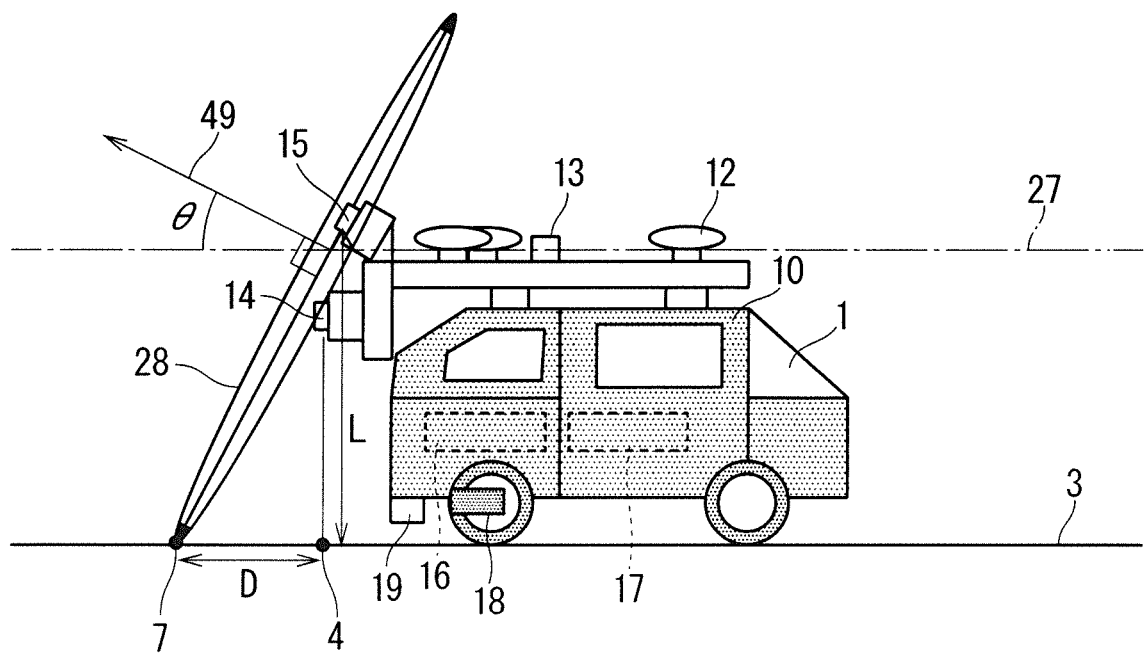
FIG. 4 is a side view explaining a second point cloud sensor belonging to the structure measuring device according to the first embodiment of the present invention.

FIG. 1 is a side view showing an example of the configuration of a measuring vehicle 1 provided with a structure measuring device according to a first embodiment. FIG. 2 is a block diagram schematically showing the configuration of a measurement point correcting device 17 belonging to the structure measuring device. FIG. 3 and FIG. 4 are side views explaining a first laser scanner 14 and a second laser scanner 15 respectively belonging to the structure measuring device.

The structure measuring device is to measure the geometry of a surface of a structure around the measuring vehicle 1 (FIG. 1). The structure measuring device includes a position and attitude sensor, the first laser scanner 14 (first point cloud sensor), the second laser scanner 15 (second point cloud sensor), a measurement coordinate point calculating unit 16 (a measurement coordinate point calculator), and the measurement point correcting device 17 (illustrated in detail in FIG. 2).

The position and attitude sensor is to sense the position and attitude of the measuring vehicle 1. Here, "position" means a three-dimensional representative position of the measuring vehicle 1. More specifically, "position" is represented by three-dimensional coordinates (x, y, z) as described later, for example. "Attitude" means a three-dimensional orientation of the measuring vehicle 1. More specifically, "attitude" is represented by orientation (roll) around a front-back axis 27 (FIGS. 3 and 4) of the measuring vehicle 1, orientation (pitch) around a right-left axis (in FIGS. 1, 3, and 4, an axis extending in a direction vertical to the plane of the sheet) of the measuring vehicle 1, and orientation (yaw) around a top-down direction of the measuring vehicle 1 (in FIGS. 1, 3, and 4, an axis extending in the vertical direction). Thus, by determining "position" and "attitude," the three-dimensional arrangement of the measuring vehicle 1 is determined uniquely. The position and attitude sensor is not limited to a sensor for directly sensing a position and attitude but is required only to be a sensor for sensing information for calculating a position and attitude. In other words, the position and attitude sensor is to sense a position and attitude directly or indirectly.

In the illustration of the drawing, the position and attitude sensor includes three GPS receivers 12, an inertial sensor 13, an odometer 18, and a speed detector 19. Locating the three GPS receivers 12 at different positions allows sensing of both a position and an attitude using only the GPS receivers 12. However, if it is difficult to receive radio waves from a GPS satellite in a place such as inside a tunnel, for example, a different sensing method is required to be used in combination or to be used as an alternative. For typical measurement of a position and attitude in a tunnel, a position and attitude measured by a GPS immediately before entry into the tunnel are used as a reference, and displacement from this reference is measured by a sensor other than the GPS receiver. In the illustration of the drawing, the inertial sensor 13, the odometer 18, and the speed detector 19 are provided. These are exemplary structures of the position and attitude sensor. As described above, the position and attitude sensor is only required to be a sensor capable of measuring "position" and "attitude."

The first laser scanner 14 (FIG. 3) senses relative positions of multiple first measurement points from the measuring vehicle 1 by scanning the interior of a first measurement surface 26 traveling together with the measuring vehicle 1. The second laser scanner 15 (FIG. 4) senses relative positions of multiple second measurement points from the measuring vehicle 1 by scanning the interior of a second measurement surface 28 traveling together with the measuring vehicle 1. In the following description, the first laser scanner 14 and the second laser scanner 15 may collectively be called a "laser scanner" simply. The first measurement surface 26 and the second measurement surface 28 may collectively be called a "measurement surface" simply. Further, the first measurement point and the second measurement point may collectively be called a "measurement point" simply.

The measurement point is measured with a laser pulse from the laser scanner along a line of intersection of a surface of a structure around the laser scanner and the measurement surface. A surface to be measured includes a part in which a measurement result by the first laser scanner 14 and a measurement result by the second laser scanner 15 are compared to each other, and this part will also be called a "comparison part" in the following description. This comparison is made for acquiring information necessary for further data processing on the measurement results, more specifically, for process of correcting the measurement results. In particular, the comparison part forming at least a part of the foregoing line of intersection and existing in a linear pattern will also be called a "linear part" in the following description. Thus, the "linear part" is a type of "comparison part." In this embodiment, measurement results obtained by the first laser scanner 14 and the second laser scanner 15 to be compared to each other are about a flat road surface 3 as a part of a surface of a structure. Thus, in this embodiment, the comparison part is a linear part extending along a straight line vertical to the front-back axis 27 of the measuring vehicle. The term "linear part" itself in this description does not imply extension along a straight line and does not exclude extension along a curved line.

The second measurement surface 28 differs from the first measurement surface 26. The first laser scanner 14 and the second laser scanner 15 are attached to the same measuring vehicle 1, so that the first measurement surface 26 and the second measurement surface 28 are to maintain a relative positional relationship and travel together. In this embodiment, a normal vector to each of the first measurement surface 26 and the second measurement surface 28 has a component of zero along the right-left axis of the measuring vehicle 1. Preferably, the first measurement surface 26 is orthogonal to the front-back axis 27 of the measuring vehicle 1. In other words, the normal vector to the first measurement surface 26 extends along the front-back axis 27 of the measuring vehicle 1. More preferably, for reason described later, the normal vector to the second measurement surface 28 is tilted about 30 degrees from the front-back axis 27 of the measuring vehicle 1.

On the basis of relative positions of multiple first measurement points sensed by the first laser scanner 14 and an estimated position and attitude the measuring vehicle 1 has at a time when each of the first measurement points is sensed, the measurement coordinate point calculating unit 16 calculates multiple first measurement coordinate points forming a three-dimensional point cloud representing these multiple first measurement points. On the basis of relative positions of multiple second measurement points sensed by the second laser scanner 15 and an estimated position and attitude the measuring vehicle 1 has at a time when each of the second measurement points is sensed, the measurement coordinate point calculating unit 16 calculates multiple second measurement coordinate points forming a three-dimensional point cloud representing these multiple second measurement points.

The measurement point correcting device 17 is to correct at least either a group of the multiple first measurement coordinate points or a group of the multiple second measurement coordinate points representing the geometry of a surface of a structure acquired by scanning of the interior of the first measurement surface 26 and the interior of the second measurement surface 28. The measurement point correcting device 17 includes a storage unit 21 (storage), a comparison part extracting unit 22 (a comparison part extractor), a difference calculating unit 23 (a difference calculator), an error calculating unit 24 (an error calculator), and a coordinate value correcting unit 25 (a coordinate value corrector).

The storage unit 21 stores the multiple first measurement coordinate points and the multiple second measurement coordinate points together with respective measurement times. The measurement times may be stored in units of groups of multiple measurement coordinate points assumable to be measured at substantially the same time. For example, times in a period in which scanning by the laser scanner rotates one turn within the measurement surface are assumable to be substantially the same time.

The comparison part extracting unit 22 extracts a first comparison point cloud representing a comparison part on a surface of a structure from the multiple first measurement coordinate points stored in the storage unit 21. Further, the comparison part extracting unit 22 extracts a second comparison point cloud representing a comparison part on the surface of the structure from the multiple second measurement coordinate points stored in the storage unit 21. More specifically, the parts to be used for correcting error in information about the position and attitude of the measuring vehicle 1 are extracted from the multiple first measurement coordinate points and the multiple second measurement coordinate points. In this embodiment, a part assumable to be a linear part on the road surface 3 is extracted from the measurement coordinate points. In particular, the comparison point cloud representing the linear part may also be called a "linear point cloud" in the following description. Thus, the "linear point cloud" is a type of "comparison point cloud." The comparison point cloud includes at least one measurement coordinate point. The linear point cloud includes multiple measurement coordinate points, and these measurement coordinate points are aligned in a linear pattern corresponding to the geometry of the linear part. Further, the comparison part extracting unit 22 of this embodiment calculates a characteristic numerical value used for calculating the foregoing error about the arrangement of each comparison point cloud. More specifically, the comparison part extracting unit 22 calculates an average height of each linear point cloud.

The difference calculating unit 23 calculates a difference between the first comparison point cloud and the second comparison point cloud corresponding to measurement of a common comparison part on the surface of the structure. The difference calculating unit 23 of this embodiment calculates an average height of a linear point cloud corresponding to the first comparison point cloud and an average height of a linear point cloud corresponding to the second comparison point cloud.

The error calculating unit 24 calculates error having time dependence included in coordinate values about the multiple first measurement coordinate points and coordinate values about the multiple second measurement coordinate points on the basis of the difference calculated by the difference calculating unit 23. In this embodiment, height error is calculated as the error having time dependence.

The coordinate value correcting unit 25 corrects a coordinate value about at least one of a group of the multiple first measurement coordinate points and a group of the multiple second measurement coordinate points on the basis of the error calculated by the error calculating unit 24.

(Details of Configuration and Operation)

By referring to FIG. 1, the measuring vehicle 1 includes a body 10 and a top plate 11 arranged over the body 10. The measurement coordinate point calculating unit 16 and the measurement point correcting device 17 are installed on the body 10. The GPS receiver 12 and the inertial sensor 13 are installed on the top plate 11. The first laser scanner 14 and the second laser scanner 15 are installed on the top plate 11. The top plate 11 forms a base as a reference for the positions of installation of the GPS receiver 12 and the inertial sensor 13 and as a reference for the positions of installation of the first laser scanner 14 and the second laser scanner 15.

The measurement coordinate point calculating unit 16 calculates the positions of the first laser scanner 14 and the second laser scanner 15 themselves from the position and attitude of the measuring vehicle 1 measured by the position and attitude sensor. Further, the measurement coordinate point calculating unit 16 calculates a first measurement coordinate point from the calculated position of the first laser scanner 14 and directions and distances of irradiation of multiple first measurement points measured by the first laser scanner 14 with a laser pulse. Likewise, the measurement coordinate point calculating unit 16 calculates a second measurement coordinate point from the calculated position of the second laser scanner 15 and directions and distances of irradiation of multiple second measurement points measured by the second laser scanner 15 with a laser pulse.

Referring to FIG. 2, on the basis of point cloud data 20 as a group of first measurement coordinate points and a group of second measurement coordinate points determined by the first laser scanner 14 and the second laser scanner 15 respectively, the measurement point correcting device 17 estimates a value of correction to a coordinate value in each measurement time point in the point cloud data 20, thereby correcting the coordinate value in the point cloud data 20. The storage unit 21 stores the point cloud data 20. The comparison part extracting unit 22 extracts a measurement coordinate point corresponding to a comparison part, namely, a comparison point cloud from the point cloud data 20.

Referring to FIG. 3, the first laser scanner 14 emits a laser pulse repeatedly. The first laser scanner 14 rotates a direction of emission of the laser pulse around one axis as viewed from the first laser scanner 14. In other words, the first laser scanner 14 rotates a direction of emission of the laser pulse within a plane as viewed from the first laser scanner 14. This plane corresponds to the first measurement surface 26. The measuring vehicle 1 to which the first laser scanner 14 is attached makes motion, so that the laser pulse is emitted in a spiral pattern as viewed from a stationary coordinate system. Meanwhile, a rotation cycle of the first laser scanner 14 is considerably short, so that a direction of emission rotates in a considerably short length of time. For this reason, a plane formed by the direction of emission within a period of one rotation of the laser scanner can be regarded as a plane, even as viewed from the stationary coordinate system. Thus, during one rotation of the direction of emission, the first laser scanner 14 is to scan the interior of the first measurement surface 26, which is practically a plane. By doing so, a part on a surface of a structure around the first laser scanner 14 and corresponding to a line of intersection with the first measurement surface 26 is scanned with the laser pulse. This line of intersection includes a part to attract attention for further data processing and this part corresponds to a comparison part relating to the first laser scanner 14 (in this embodiment, a linear part). Some of multiple first measurement coordinate points determined by the first laser scanner 14 and corresponding to the comparison part are to be extracted as a first comparison point cloud (in this embodiment, linear point cloud) by the comparison part extracting unit 22 (FIG. 2). Further, the first laser scanner 14 detects a reflected beam from the surface of the structure irradiated with the laser pulse. A distance is calculated from a time when the reflected beam is received or phase information about the reflected beam. Using the distance and the direction of emission, the first laser scanner 14 measures a position of a point where the reflected beam has been generated relative to the first laser scanner 14. In other words, the first laser scanner 14 measures a relative coordinate value about a first measurement point relative to the position of the first laser scanner 14.

In the illustration of the drawing, the first laser scanner 14 is arranged in such a manner that the first measurement surface 26 is orthogonal to the front-back axis 27 of the measuring vehicle 1. By doing so, a normal vector to the first measurement surface 26 extends along the front-back axis 27 of the measuring vehicle 1. Preferably, the first laser scanner 14 is installed in a manner allowing measurement along an entire periphery of rotation of scanning, in other words, in all directions within the first measurement surface 26. In the illustration of the drawing, the first laser scanner 14 is installed at the back of the top plate 11. In FIG. 3, the front-back axis 27 is drawn to pass through the position of the inertial sensor 13 as a representative position of the measuring vehicle 1.

Referring to FIG. 4, the second laser scanner 15 operates in a similar manner to the first laser scanner 14 while being attached in a different direction. By doing so, a part on a surface of a structure around the second laser scanner 15 and corresponding to a line of intersection with the second measurement surface 28 is scanned with a laser pulse. This line of intersection includes a part to attract attention for further data processing and this part corresponds to a comparison part relating to the second laser scanner 15 (in this embodiment, a linear part). Some of multiple second measurement coordinate points determined by the second laser scanner 15 and corresponding to the comparison part are to be extracted as a second comparison point cloud (in this embodiment, linear point cloud) by the comparison part extracting unit 22 (FIG. 2). Further, the second laser scanner 15 detects a reflected beam from the surface of the structure irradiated with the laser pulse. A distance is calculated from a time when the reflected beam is received or phase information about the reflected beam. Using the distance and the direction of emission, the second laser scanner 15 measures a position of a point where the reflected beam has been generated relative to the second laser scanner 15. In other words, the second laser scanner 15 measures a relative coordinate value about a second measurement point relative to the position of the second laser scanner 15. Preferably, the second laser scanner 15 is installed in a manner allowing measurement along an entire periphery of rotation of scanning, in other words, in all directions within the second measurement surface 28. In the illustration of the drawing, the second laser scanner 15 is installed at the back of the top plate 11. Like in FIG. 3, the front-back axis 27 in FIG. 4 is drawn to pass through the position of the inertial sensor 13 as a representative position of the measuring vehicle 1.

The second laser scanner 15 is attached to the measuring vehicle 1 in such a manner as to make a difference between the second measurement surface 28 and the first measurement surface 26 (FIG. 3). A normal vector to the second measurement surface 28 is a vector within a plane defined by the front-back axis 27 (an axis extending in the transverse direction of FIG. 3) and a top-down axis (an axis extending in the vertical direction of FIG. 3) of the measuring vehicle. More specifically, the normal vector to the second measurement surface 28 is tilted by a tilt angle θ from the front-back axis 27 of the measuring vehicle 1. The tilt angle θ is larger than zero degrees and less than 90 degrees. As illustrated, if the second laser scanner 15 is attached to the back of the measuring vehicle 1, the normal vector to the second measurement surface 28 is tilted upward by the tilt angle θ relative to a backward direction of the measuring vehicle 1. As a modification, if the second laser scanner 15 is attached to the front of the measuring vehicle 1, the normal vector to the second measurement surface 28 is tilted upward by the tilt angle θ relative to a frontward direction of the measuring vehicle 1.

As a result of the foregoing arrangement, a linear part 7 scanned by the second laser scanner 15 by one rotation of a direction of emission differs from a linear part 4 scanned by the first laser scanner 14 by one rotation of a direction of emission when these linear parts are compared at substantially the same time. More specifically, these linear parts are separated by a distance D in the front-back direction of the measuring vehicle 1. Meanwhile, the linear part 7 scanned at some time may agree with the linear part 4 scanned at a different time. In the example of the illustration, the linear part 4 agrees with the linear part 7 scanned after the measuring vehicle 1 travels the distance D after scanning of the linear part 4. As a modification, if the second laser scanner 15 is attached to the front of the measuring vehicle 1, the linear part 7 agrees with the linear part 4 scanned after the measuring vehicle 1 travels the distance D after scanning of the linear part 7.

With the height of the second laser scanner 15 from the road surface 3 as a surface of a structure defined as L, in the configuration of the measuring vehicle 1 shown in FIG. 4, the distance D between the linear part 4 and the linear part 7 measured at the same time is calculated as D=L·tan θ. With the speed of the measuring vehicle 1 defined as v, a length of time Td required for the measuring vehicle 1 to travel the distance D is calculated as Td=D/v. If the length of time Td is approximately equal to a measurement cycle of the position and attitude sensor, a linear part measured by the first laser scanner 14 in coincidence with timing of measurement by the position and attitude sensor is to be measured by the second laser scanner 15 in coincidence with timing of measurement after passage of one cycle of measurement by the position and attitude sensor. In this case, measurement error in the position and attitude becomes substantially equal to a drift of the inertial sensor 13 used as the position and attitude sensor. Assuming that this drift does not change largely within one measurement cycle, this linear part becomes usable as a stable zone described later. The measurement cycle is generally about 0.1 seconds. Thus, with the foregoing length of time Td set to be equal to the measurement cycle of 0.1 seconds and typical parameters of the measuring vehicle 1 including L and v set at 2 m and 40 km per hour respectively, θ is calculated to be 29° from the foregoing formula. An angle of about one degree is sufficiently assumable to be error, so that the tilt angle θ may preferably be about 30 degrees. Under this condition, the measuring vehicle 1 travels about 11 m in a length of time corresponding to the measurement cycle. A tunnel as a typical example of a measurement target is generally evaluated in units of ranges having a length of 10.5 m called a span, so that error can be determined with high accuracy under the foregoing condition. With increase in the speed v, a length of time required for travel by the distance D can be shortened, making it possible to ensure accuracy even at the increased speed v. For this reason, a speed higher than 40 km per hour or more suitable for evaluation of expressways may be used.

Figure 5:
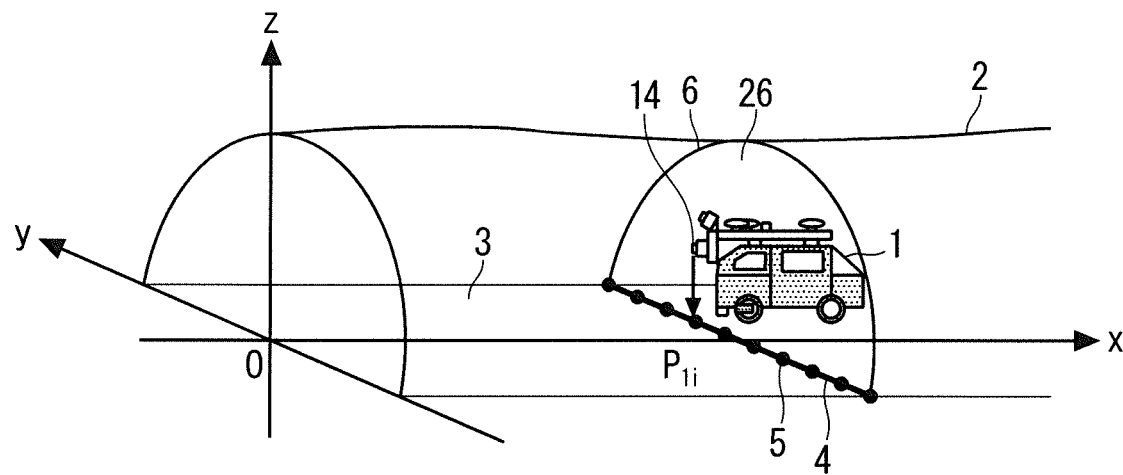
FIG. 5 is a perspective view explaining operation in a tunnel by the first point cloud sensor belonging to the structure measuring device according to the first embodiment of the present invention.
Figure 6:
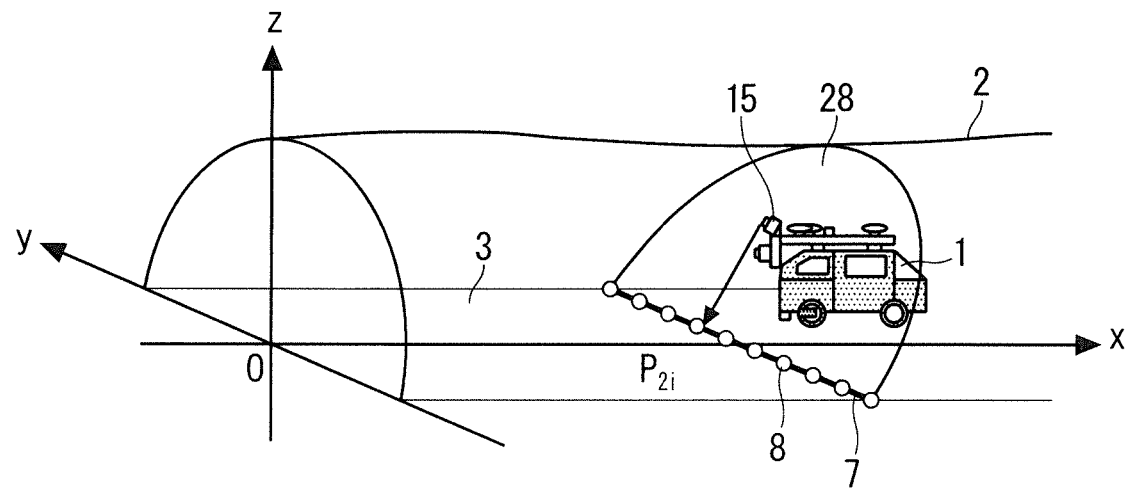
FIG. 6 is a perspective view explaining operation in the tunnel by the second point cloud sensor belonging to the structure measuring device according to the first embodiment of the present invention.

FIGS. 5 and 6 are perspective views explaining operations in a tunnel 2 of the first laser scanner 14 and the second laser scanner 15 respectively. Measurement of the tunnel 2 (FIGS. 5 and 6) will be described below by referring to these drawings. An orthogonal coordinate system with an x axis, a y axis, and a z axis is used as a coordinate system. The x axis corresponds to the axis direction of the tunnel 2. The y axis corresponds to a horizontal axis and a leftward direction relative to the x axis. The z axis corresponds to a vertically upward direction. The description is given on the assumption that, while the measuring vehicle 1 travels in the tunnel 2, the direction of the front-back axis 27 of the measuring vehicle 1 agrees with the x axis. A measurement time is defined as t. This coordinate system is given as an example for description. Even if a different coordinate system with a latitude, a longitude, and an altitude is used, processing similar to the foregoing processing can still be performed through making appropriate transformation.

The first laser scanner 14 (FIG. 5) scans the linear part 4 as a line of intersection with the first measurement surface 26 on the road surface 3 with a laser pulse. The linear part 4 is vertical to the x axis. Multiple measurement coordinate points $P_{1i}$ (first measurement coordinate points) are acquired in association with multiple measurement points 5 (first measurement points) measured continuously on the linear part 4. The point "$P_{1i}$" means an i-th point of measurement coordinate points forming point cloud data acquired by the first laser scanner 14. A coordinate value about the measurement coordinate point $P_{1i}$ is defined as $(x_{1i}, y_{1i}, z_{1i})$ and a time of measurement of this measurement coordinate point is defined as $\tau_{1i}$. One linear part 4 is scanned in a considerably short length of time, so that measurement times of the measurement points 5 on this linear part may be represented by one time. In the following description, the first measurement coordinate points may collectively be called $P_{1i}$. By accumulating the measurement coordinate points $P_{1i}$, point cloud data about the first laser scanner 14 is formed.

The second laser scanner 15 (FIG. 6) scans the linear part 7 as a line of intersection with the second measurement surface 28 on the road surface 3 with a laser pulse. The linear part 7 is vertical to the x axis. Multiple measurement coordinate points $P_{2i}$ (second measurement coordinate points) are acquired in association with multiple measurement points 8 (second measurement points) measured continuously on the linear part 7. The point "$P^{2i}$" means an i-th point of measurement coordinate points forming point cloud data acquired by the second laser scanner 15. A coordinate value about the measurement coordinate point $P_{2i}$ is defined as $(x_{2i}, y_{2i}, z_{2i})$ and a time of measurement of this measurement coordinate point is defined as $\tau_{2i}$. One linear part 7 is scanned in a considerably short length of time, so that measurement times of the measurement points 8 on this linear part may be represented by one time. In the following description, the second measurement coordinate points may collectively be called $P_{2i}$. By accumulating the measurement coordinate points $P_{2i}$, point cloud data about the second laser scanner 15 is formed.

Figure 7:
FIG. 7 is a schematic view showing point cloud data measured by the first point cloud sensor and stored in a storage unit belonging to the structure measuring device according to the first embodiment of the present invention.

FIG. 7 is a schematic view showing the point cloud data 20 measured by the first laser scanner 14. In the drawing, a subscript "K" means the number of measurement coordinate points $P_{1i}$. The point cloud data 20 is stored in the storage unit 21 (FIG. 2). Comparable point cloud data about the second laser scanner 15 is also stored.

As the first measurement surface 26 (FIG. 5) is orthogonal to the front-back axis 27 of the measuring vehicle 1 (FIG. 3), the first measurement surface 26 is to be orthogonal to the x axis during traveling in a tunnel. Thus, as long as the first laser scanner 14 is attached so as not to make the first measurement surface 26 cross the measuring vehicle 1, the measurement coordinate points $P_{1i}$ along a transverse plane 6 of the tunnel 2 entirely can be acquired through one scanning. The inner wall of the tunnel 2 is assumable to be a columnar body with a transverse plane as a bottom surface, making it possible to prevent error in the attitude of the measuring vehicle 1, particularly, error in yaw and pitch from developing as unevenness in a measurement result about an inner wall surface. Scanning by the laser scanner proceeds through high-speed rotation such as 200 rotations per second, for example, meaning that one scanning (one rotation) takes a considerably short length of time. For this reason, the vibration of the measuring vehicle 1 is assumable to be a cause for similar error in each measurement coordinate point during one scanning. As a result, the positions of multiple measurement coordinate points relative to each other acquired by one scanning can be considered to represent the geometry of the transverse plane 6 properly.

As described above, the second laser scanner 15 (FIG. 6) is attached in a direction tilted frontward or backward from the direction of attachment of the first laser scanner 14 (FIG. 5). Thus, the linear part 7 on the road surface 3 scanned by the second laser scanner 15 is to be separated from and parallel to the linear part 4 on the road surface 3 scanned by the first laser scanner 14. Like the first laser scanner 14, the second laser scanner 15 performs high-speed scanning, making it possible to acquire the proper positions of the measurement coordinate points $P_{2i}$ relative to each other acquired through one scanning.

FIG. 8 is a perspective view explaining operations in the tunnel 2 of the first laser scanner 14 and the second laser scanner 15. It is assumed that the first laser scanner 14 senses one linear part 4 on the road surface 3. The one linear part 4 is measured substantially momentarily. Then, at a time when the measuring vehicle 1 has traveled a distance Δx, the second laser scanner 15 senses the linear part 7. If this distance Δx is equal to the distance D (FIG. 4), the linear part 4 and the linear part 7 become the same. In this way, according to this embodiment, a common linear part on the road surface 3 is sensed at different times by the first laser scanner 14 and the second laser scanner 15. This common linear part sensed in this way is called a linear part x. Further, average heights of the linear part x calculated on the basis of information from the first laser scanner 14 and information from the second laser scanner 15 are called a height $z_1(x)$ and $z_2(x)$ respectively. While the height $z_1(x)$ and the height $z_2(x)$ indicate average heights of the same linear part x, these heights may differ from each other. This will be described below.

The height $z_1(x)$ and the height $z_2(x)$ are measured at different times. These different times may cause a difference in error about information about the position and attitude of the measuring vehicle 1. For example, at the moment when information is output from the position and attitude sensor, information about a position and attitude can be acquired directly. At the other times, however, estimating a position and attitude by allowing for a certain degree of error becomes unavoidable. Information about the position and attitude of the measuring vehicle 1 is used in calculating the height $z_1(x)$ and the height $z_2(x)$. This eventually causes the probability of difference between the height $z_1(x)$ and the height $z_2(x)$.

Strictly speaking, multiple linear regions to be sensed by each laser scanner are spaced at intervals on the road surface 3, so that the first laser scanner 14 and the second laser scanner 15 are generally not to sense the same line in a strict sense. As a result of a considerably short cycle of scanning described above, however, these intervals become considerably short. Thus, the first laser scanner 14 and the second laser scanner 15 can be considered to sense substantially the same line. As a modification for increasing accuracy, instead of using data about one linear part 4, data acquired by making complementation (averaging, for example) between two linear parts 4 in front of and behind the linear part 7 may be used.

Figure 9:
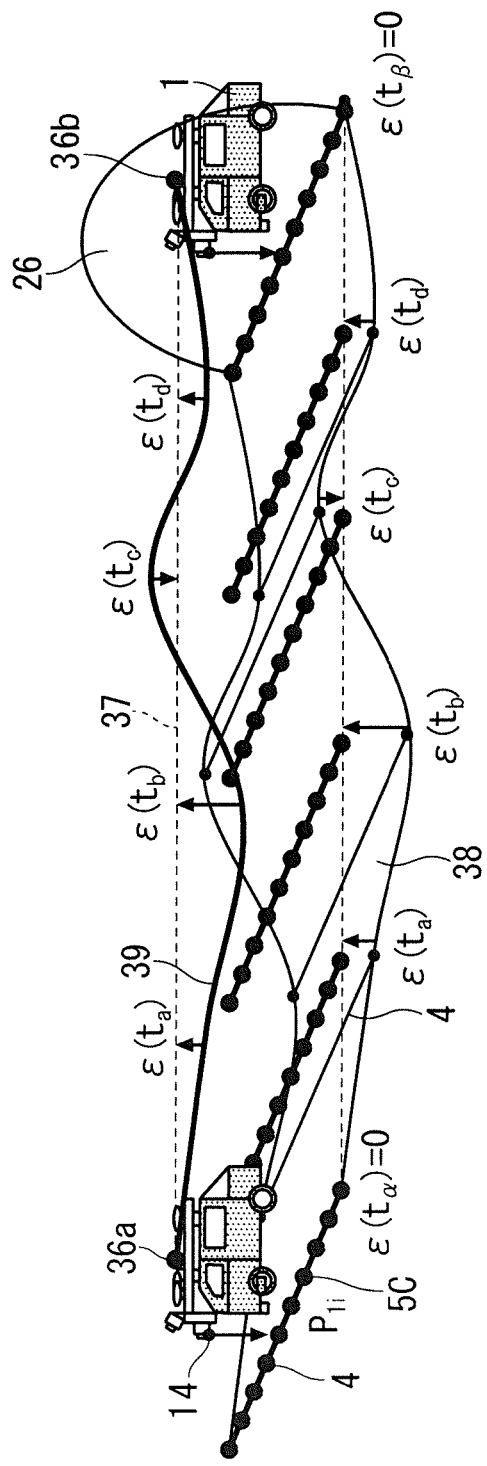
FIG. 9 is a perspective view explaining vertical error in a measurement coordinate point caused by the first point cloud sensor belonging to the structure measuring device according to the first embodiment of the present invention.

FIG. 9 is a perspective view explaining error in the measurement coordinate point Pit caused by the first laser scanner 14. In the presence of unevenness on the road surface 3, the measuring vehicle 1 vibrates vertically. If a height changes more finely than a cycle of measurement by the position and attitude sensor, information from the position and attitude sensor is not sufficient for acquiring a height with high accuracy at every time t. This makes height error $\varepsilon(t)$ not ignorable in the measurement coordinate point $P_{1i}$ at the time t. More specifically, a z coordinate value about the measurement coordinate point $P_{1i}$ at the time t is to be measured as a coordinate value larger by $\varepsilon(t)$ than a true z coordinate value about a measurement point. In the drawing, as the time t progresses as $t_a$, $t_b$, $t_c$, and $t_d$, the height error $\varepsilon(t)$ changes. In response to this change, a linear point cloud 5C calculated through sensing of measurement points on the linear part 4 is recognized at positions vertically shifted from the linear part 4. Assuming that the position and attitude sensor of the measuring vehicle 1 outputs the position of the measuring vehicle 1 at a time $t_\alpha$ and a time $t_\beta$, the position of the measuring vehicle 1 at these times can be recognized without error. Namely, $\varepsilon(t_\alpha)=\varepsilon(t_\beta)=0$ is established. At these times, the linear point cloud 5C indicates a true position of a measurement point on the linear part 4. Meanwhile, the position and attitude sensor does not output a position (here, this particularly means a height) in a period of $t_\alpha < t < t_\beta$. This requires a position to be acquired by approximation using a position 36a at the time $t_\alpha$ and a position 36b at the time $t_\beta$. Typically, the measuring vehicle 1 is assumed to have passed through a route 37 connecting the positions 36a and 36b. The route 37 contains the height error $\varepsilon(t)$ from a true route 39 along actual undulations 38 on a road surface, and this height error is regarded as it is as error in the measurement coordinate point $P_{1i}$. In the drawing, the height error $\varepsilon(t)$ is illustrated as changing between the times $t_\alpha$ and $t_\beta$ as follows: $t_a$, $t_b$, $t_c$, and $t_d$.

Figure 10:
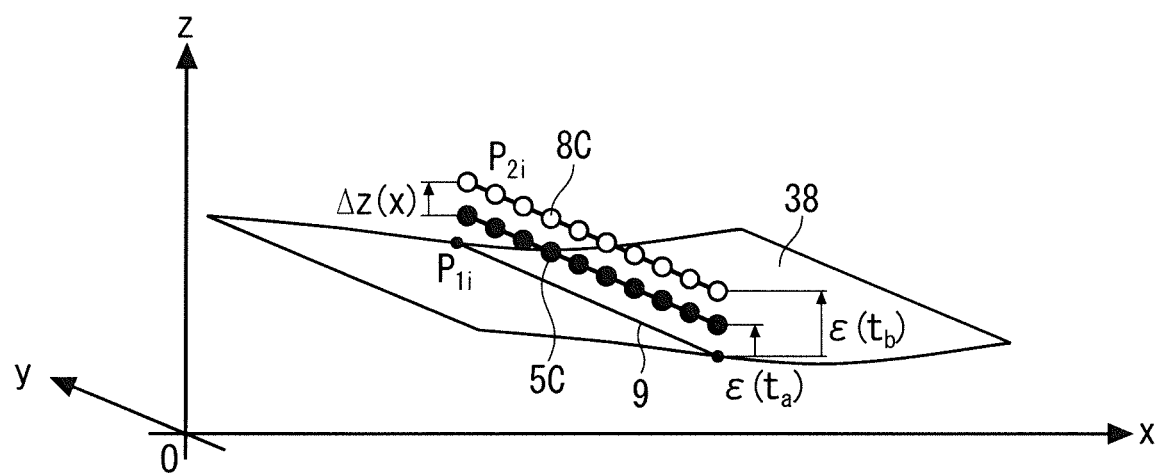
FIG. 10 is a perspective view explaining a relationship between vertical error in the first point cloud sensor and vertical error in the second point cloud sensor belonging to the structure measuring device according to the first embodiment of the present invention.

FIG. 10 is a perspective view explaining a relationship between error in the measurement coordinate point $P_{1i}$ determined by the first laser scanner 14 and error in the measurement coordinate point $P_{2i}$ determined by the second laser scanner 15. It is assumed that a linear part 9 is measured at the time $t_a$ as the linear point cloud 5C by the first laser scanner 14 and is measured at the time $t_b$ as a linear point cloud 8C by the second laser scanner 15. As a result of a difference between height error $\varepsilon(t_a)$ and height error $\varepsilon(t_b)$, a measured height of the linear point cloud 5C and a measured height of the linear point cloud 8C differ from each other.

The following description is based on the assumption that the common linear part x is measured at a time $t_1$ and a time $t_2$ differing from each other by the first laser scanner 14 and the second laser scanner 15 respectively. In consideration of an average of heights of the linear part x, a true height of the linear part x is defined as $z^*(x)$. Further, an average height calculated from the measurement coordinate points $P_{1i}$ acquired through measurement of the linear part x by the first laser scanner 14 is defined as $z_1(x)$, and an average height calculated from the measurement coordinate points $P_{2i}$ acquired through measurement of the linear part x by the second laser scanner 15 is defined as $z_2(x)$. In this case, the following relationships are established:

$$z_1(x)=z^*(x)+\varepsilon(t_1); \text{ and}$$

$$z_2(x)=z^*(x)+\varepsilon(t_2).$$

In this example, the linear part x is assumed to be on a road surface. In this case, a measurement coordinate point acquired by measurement in a lane along which the measuring vehicle 1 travels is selectable as a linear point cloud corresponding to the linear part x. This measurement coordinate point may be a measurement coordinate point selected from a range from 2.75 to 3.5 m in the right-left direction of the measuring vehicle 1 covering the center of the measuring vehicle 1, for example. As a modification, in the case of a road with multiple lanes, a measurement coordinate point in a range covering these lanes is selectable.

By establishing a definition that $\Delta z(x)=z_2(x)-z_1(x)$, the following relationship is established:

$$\Delta z(x)=\varepsilon(t_2)-\varepsilon(t_1).$$

The left side $\Delta z(x)$ can be calculated from a difference between the measurement coordinate point $P_{1i}$ corresponding to the linear part x determined by the first laser scanner 14 and the measurement coordinate point $P_{2i}$ corresponding to the linear part x determined by the second laser scanner 15. In this way, an amount of change in $\varepsilon(t)$ between a value at the time $t=t_1$ and a value at the time $t=t_2$ can be found, and the function $\varepsilon(t)$ can be determined on the basis of the amount. A value of x for identifying a linear part has one-to-one correspondence with the time t when this linear part is measured by the first laser scanner 14. Thus, the function $\Delta z(x)$ relating to x can be replaced with the function $\Delta z(t)$ relating to corresponding t. Assuming that the linear part x is measured at the time $t_1$ by the first laser scanner 14, the foregoing formula is rewritten as follows:

$$\Delta z(t_1)=\varepsilon(t_2)-\varepsilon(t_1).$$

As long as a traveling direction of the measuring vehicle 1 is not reversed, the time $t_1$ when the common linear part x is measured by the first laser scanner 14 and the time $t_2$ when the common linear part x is measured by the second laser scanner 15 have one-to-one correspondence with each other, and can be calculated on the basis of an actual speed of the measuring vehicle 1 or can be calculated in advance on the basis of a planned speed. A measurement time of a point cloud is also available for the calculation. In particular, if the measuring vehicle 1 is traveling at a constant speed, the following relationship is established:

$$t_2=t_1+\Delta t (\Delta t \text{ is a constant value}).$$

If $\Delta t$ falls within a cycle of measurement by the position and attitude sensor, influence of a drift over a measured value acquired by the position and attitude sensor is reduced in using measured data at the time $t_1$ and measured data at the time $t_2$ in combination.

Figure 11:
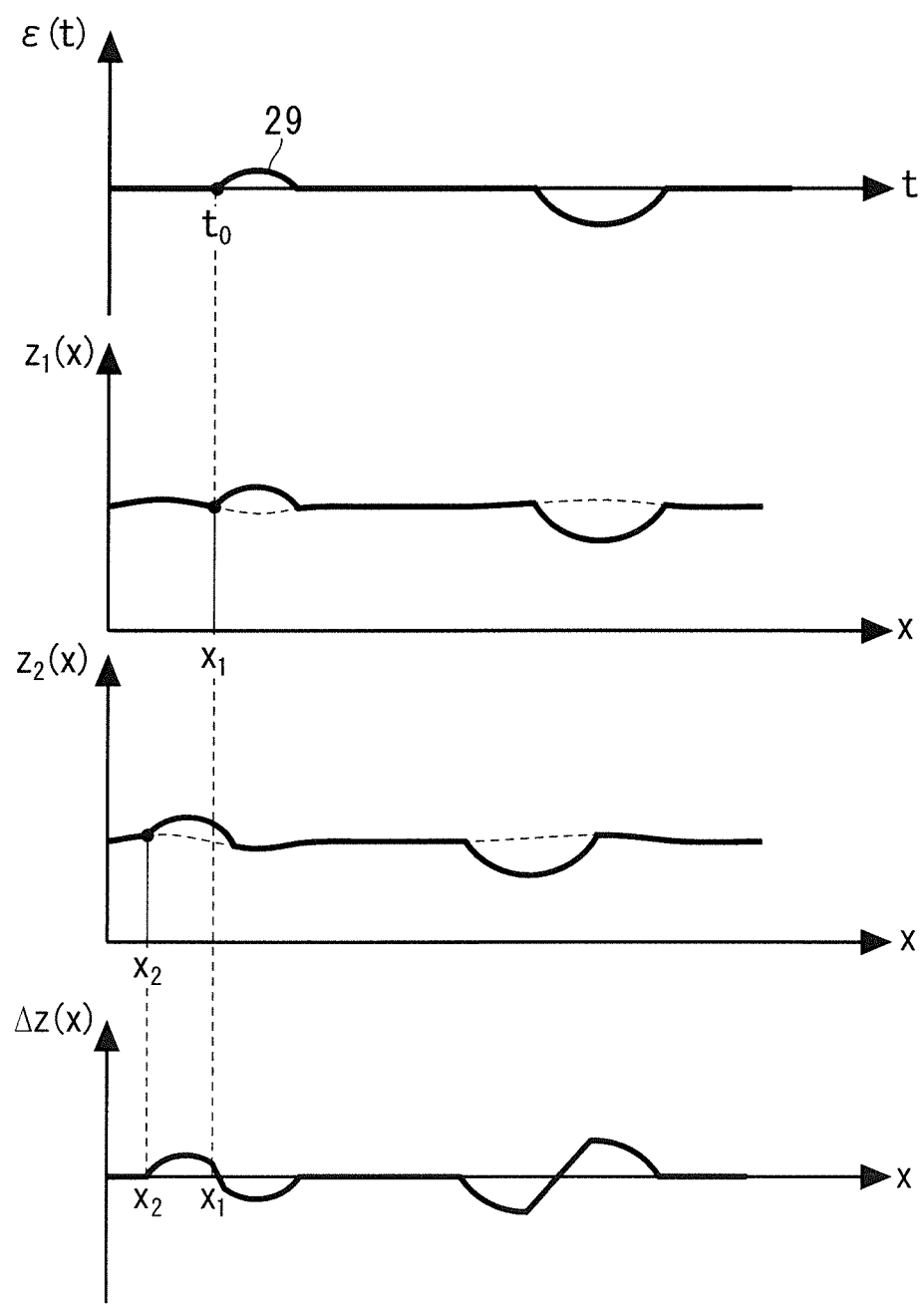
FIG. 11 is a graph for explaining an algorithm for calculation of height error by the structure measuring device according to the first embodiment of the present invention.

An exemplary method of calculating the function $\varepsilon(t)$ will be described below using FIGS. 11 to 13. First, referring to FIG. 11, it is assumed that the height error $\varepsilon(t)$ has occurred at the time t. In particular, it is assumed that error 29 has caused at time $t_0$ due to vibration of the measuring vehicle 1 occurring from undulations on a road surface, for example. It is assumed that, when the error 29 starts to occur, the first laser scanner 14 and the second laser scanner 15 measure a linear part $X_1$ and a linear part $X_2$ respectively. The linear part $X_1$ and the linear part $X_2$ are different linear parts. Thus, the height error $\varepsilon(t)$ is reflected in $\Delta z(x)$ calculated from a difference between the heights $z_1(x)$ and $z_2(x)$ measured by the first laser scanner 14 and the second laser scanner 15 respectively.

Figure 12:
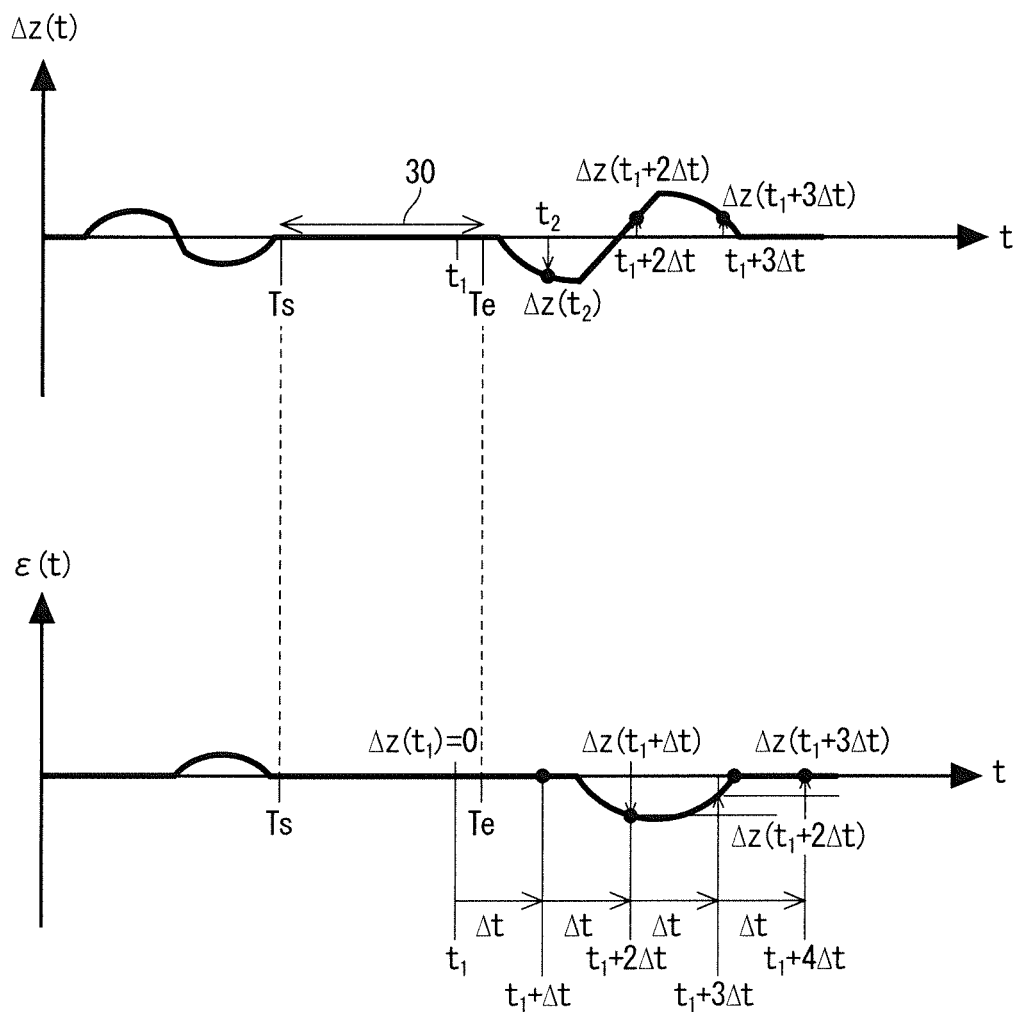
FIG. 12 is a graph for explaining the algorithm for calculation of the height error by the structure measuring device according to the first embodiment of the present invention.

Referring next to an upper graph in FIG. 12, $\Delta z(x)$ mentioned above is replaced with the function $\Delta z(t)$ relating to the time t. Next, a zone [Ts, Te] of the time t is extracted using a function $\Delta z(t)$ in which $\Delta z(t)=0$ is established for a length of time sufficiently longer than a difference between lengths of time when the first laser scanner 14 and the second laser scanner 15 measure the same linear part. This zone is also called a stable zone 30. In the stable zone 30, the height error $\varepsilon(t)$ does not change. Thus, an error value in the stable zone 30 is represented by a constant c. Namely, the following relationship is established:

$$\varepsilon(t)=c(Ts \leq t \leq Te).$$

Assuming that the time $t_1$ is within the stable zone 30, the following relationship is established:

$$\varepsilon(t_2)=\varepsilon(t_1)+\Delta z(t_1)=c+\Delta z(t_1).$$

In this way, $\varepsilon(t_2)$ can be calculated. Further, assuming that $t_2$ in the foregoing formula to be new $t_1$, process of making the following calculation is repeated:

$$\varepsilon(t_2)=\varepsilon(t_1)+\Delta z(t_1).$$

In this way, the function $\varepsilon(t)$ under $t \leq t_1$ is calculated. New $t_2$ corresponding to the calculated new $t_1$ is a time when the second laser scanner 15 scans a linear part having been scanned by the first laser scanner 14 at $t_1$. If the measuring vehicle 1 is traveling at a constant speed, the foregoing formula $t_2=t_1+\Delta t$ is established. Thus, this formula is rewritten as follows:

$$\varepsilon(t+\Delta t)=\varepsilon(t)+\Delta z(t).$$

In this case, $\varepsilon(t+\Delta t)$ can be calculated sequentially by making the replacement of $t \leftarrow t+\Delta t$.

A lower graph in FIG. 12 is a graph for explaining the foregoing calculation if c=0. By adding $\Delta z(t_1)$ to $\varepsilon(t_1)$ relating to the time $t_1$ in the stable zone 30, $\varepsilon(t_1+\Delta t)$ is determined. By adding $\Delta z(t_1+\Delta t)$ to the determined $\varepsilon(t_1+\Delta t)$, $\varepsilon(t_1+2\Delta t)$ is determined. By adding $\Delta z(t_1+2\Delta t)$ to the determined $\varepsilon(t_1+2\Delta t)$, $\varepsilon(t_1+3\Delta t)$ is determined. By adding $\Delta z(t_1+3\Delta t)$ to the determined $\varepsilon(t_1+3\Delta t)$, $\varepsilon(t_1+4\Delta t)$ is determined.

In the foregoing method, calculation is made repeatedly toward a positive temporal direction. A similar method may be used to make calculation repeatedly toward the opposite direction, as described below.

By referring to the upper graph in FIG. 12, the following relationship is established for the foregoing reason:

$$\varepsilon(t_2)=c(Ts \leq t_2 \leq Te).$$

Thus, the following relationship is established:

$$\varepsilon(t_1)=\varepsilon(t_2)-\Delta z(t_1)=c-\Delta z(t_1).$$

In this way, $\varepsilon(t_1)$ can be determined. Further, assuming $t_1$ in the foregoing formula to be new $t_2$, process of making the following calculation is repeated:

$$\varepsilon(t_1)=\varepsilon(t_2)-\Delta z(t_1).$$

In this way, the function $\varepsilon(t)$ under $t \leq t_2$ is calculated. New $t_1$ corresponding to the calculated new $t_2$ is a time when the first laser scanner 14 scans a linear part having been scanned by the second laser scanner 15 at $t_2$. If the measuring vehicle 1 is traveling at a constant speed, the foregoing formula $t_2=t_1+\Delta t$ is established as described above. Thus, this formula is rewritten as follows:

$$\varepsilon(t-\Delta t)=\varepsilon(t)-\Delta z(t-\Delta t).$$

In this case, $\varepsilon(t-\Delta t)$ can be calculated sequentially by making the replacement of $t \leftarrow t-\Delta t$.

Figure 13:
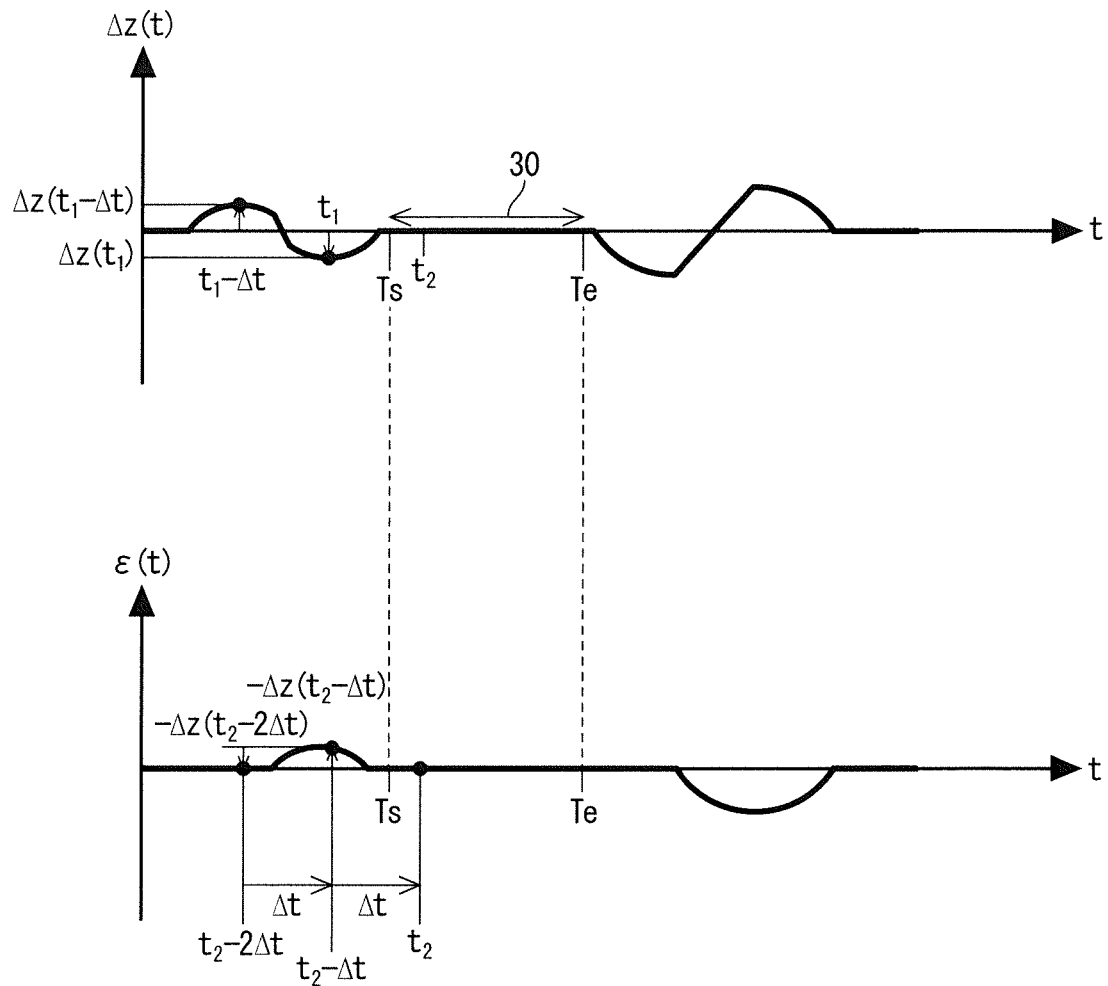
FIG. 13 is a graph for explaining the algorithm for calculation of the height error by the structure measuring device according to the first embodiment of the present invention.

A lower graph in FIG. 13 is a graph for explaining the foregoing calculation if c=0. By subtracting $\Delta z(t_2-\Delta t)$ from $\varepsilon(t_2)$ relating to the time $t_2$ in the stable zone 30, $\varepsilon(t_2-\Delta t)$ is determined. By subtracting $\Delta z(t_2-2\Delta t)$ from the determined $\varepsilon(t_2-\Delta t)$, $\varepsilon(t_2-2\Delta t)$ is determined.

The foregoing function $\varepsilon(t)$ may include an unspecified constant c. For measurement of unevenness in a tunnel, however, as long as a measured position is relatively proper, not an absolute coordinate value is not required. The constant c is added uniformly to the function $\varepsilon(t)$ and is subtracted uniformly from a z coordinate value about entire point cloud data in making correction described later, so that the constant c does not influence the properness of the relative position. For this reason, the correction process may be performed using the constant c set at zero.

By using the foregoing algorithm explained by referring to FIGS. 12 and 13, the function $\varepsilon(t)$ can be determined in a range covering an entire zone in the tunnel 2. While one stable zone 30 is selected in the foregoing description, multiple stable zones 30 may be selected and the function $\varepsilon(t)$ may be determined in front of and behind each of the stable zones 30. The resultant function $\varepsilon(t)$ may be subjected to filtering process such as smoothing for noise reduction. This also applies to the function $\Delta z(t)$. For determining the function $\varepsilon(t)$, $\Delta z(t)$ may be subjected to filtering process such as smoothing. While the function $\varepsilon(t)$ is determined discretely only at a time when the linear part x on the road surface 3 is scanned in the foregoing description, the function $\varepsilon(t)$ can be treated as a continuous function in making correction by means of primary linear interpolation, for example.

While the stable zone 30 is extracted as a zone in which $\Delta z(t)=0$ is established for a sufficiently long length of time, namely as a zone having a width in the foregoing description, the stable zone 30 may be extracted as a zone without a width and may be extracted as a momentary time t when $\Delta z(t)$ is 0. In particular, if $\Delta t$ and a cycle of measurement by the position and attitude sensor coincide with each other, both two timings of measurement of one linear part x by the first laser scanner 14 and measurement by the second laser scanner 15 are allowed to coincide with timing of measurement by the position and attitude sensor. In this case, $\Delta z(t)$ is expected to be zero at the time t corresponding to this timing. For this reason, this time t can be regarded as the stable zone 30. Further, by treating these continuous timings as candidates for the stable zones 30 and examining $\Delta z(t)$ in these zones sequentially, an optimum stable zone 30 can be extracted using a simple algorithm.

The algorithm for determining the function $\varepsilon(t)$ is not limited to the one described above. It is assumed, for example, that the position and attitude sensor measures and outputs the position and attitude of the measuring vehicle 1 at a time T. In this case, on condition that error does not occur at the time T, $\varepsilon(T)=0$ may be established independently of whether $\Delta z(T)$ is zero or not. In this case, like in the case of using a time in the stable zone 30, the time T may be assumed to be $t_1$ and the height error ε(t) can be determined as follows: ε($t_2$)=ε(T)+Δz(T). Alternatively, height error may be determined by setting ε(T) at a certain time T to be zero. In this case, ε(t) is calculated entirely with constant error. However, this does not influence relative detection of unevenness. The function ε(t) is interpolated between the times T and $t_2$.

Alternatively, the algorithm for determining the function ε(t) may be configured as follows by means of Fourier transformation. In the below, a Fourier transform with respect to a function f is expressed as F{f}, and a Fourier inverse transform with respect to the function f is expressed as $F^{-1}${f}. The foregoing formula ε(t+Δt)=ε(t)+Δz(t) is subjected to Fourier transformation to acquire the following formula.

$$F\{ε(t+Δt)\}=F\{ε(t)\}+F\{Δz(t)\}$$ [Formula 1]

The left side of this formula can be deformed as follows using ω indicating an angular frequency:

$$F\{ε(t+Δt)\}=e^{iΔtω}F\{ε(t)\}$$ [Formula 2]

As a result, the following formula is acquired:

$$e^{iΔtω}F\{ε(t)\}=F\{ε(t)\}+F\{Δz(t)\}$$ [Formula 3]

The foregoing formula is deformed to provide the following formula:

$$ε(t)=F^{-1}\{(e^{iΔtω}-1)^{-1}F\{Δz(t)\}\}$$ [Formula 4]

The element F{Δz(t)} can be determined by interpolating Δz(t) acquired from a difference between heights of a linear part continuously and performing Fourier transformation on a result of the interpolation. Further, Δt is a known value. For example, the function ε(t) can be determined between multiple stable zones using the foregoing formula.

Alternatively, ε(t) may be determined further on condition that ε(t) is expressed as a polynomial. On condition that ε(t) is a polynomial with an unknown coefficient, Δz(t) is also derived as a polynomial including an unknown. The unknown can be determined by applying Δz(t) acquired from a measurement result to this polynomial. Assuming that ε(t) is a three-order polynomial having four unknowns, for example, Δz(t) becomes a two-order polynomial having three of the four unknowns except an unknown indicating a constant term. The values of the three unknowns can be calculated by applying this two-order polynomial to Δz(t). In this modification, the last constant term can be zero to calculate ε(t). This is not the only order of the polynomial. Further, ε(t) may be expressed using a different formula. This method is applicable to any temporal range in a zone not limited to a stable zone.

Figure 14:
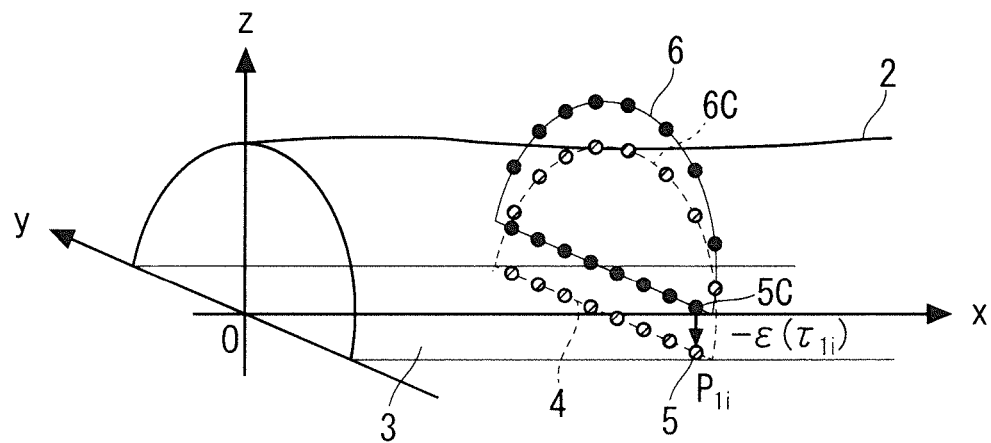
FIG. 14 is a perspective view explaining a method of correcting the height error in a measurement coordinate point occurring during operation of the structure measuring device according to the first embodiment of the present invention.

FIG. 14 is a perspective view explaining a method of correcting height error in the measurement coordinate point $P_{1i}$ determined by the first laser scanner 14. The height error ε(t) due to vertical vibration is calculated from the foregoing method, so that the correction is made to remove this error from each measurement coordinate point $P_{1i}$. A z coordinate $z_{1i}$ of the measurement coordinate point $P_{1i}$ is corrected as follows:

$$z_{1i} \leftarrow z_{1i}-ε(τ_{1i}).$$

Likewise, a z coordinate $z_{2i}$ of the measurement coordinate point $P_{2i}$ determined by the second laser scanner 15 is corrected as follows:

$$z_{2i} \leftarrow z_{2i}-ε(τ_{2i}).$$

In the drawing, regarding one scanning of the first laser scanner 14, a black circle indicates the measurement coordinate point $P_{1i}$ before the correction, and a white circle indicates the measurement coordinate point $P_{1i}$ after the correction. The height error ε ($τ_{1i}$) is calculated using the linear point cloud 5C entirely acquired from the measurement points 5 along the linear part 4 on the road surface 3, so that the entire linear point cloud 5C can be corrected with high accuracy using the height error ε($τ_{1i}$). The measurement points 5 along the linear part 4 have a relatively large ratio in multiple measurement points 5 in one transverse plane 6C. If the road surface 3 has multiple lanes of a width of 7 m and the laser scanner is set at a height of 2 m from the road surface 3, for example, the road surface 3 is subjected to scanning over a section of 120° of one rotation of the laser scanner. Namely, the road surface 3 is scanned to a ratio of ⅓. Even if the road surface 3 is a single lane having a width of 3.5 m, a ratio of the scanning still reaches about 23%. Further, multiple measurement points 5 in one transverse plane 6C to be measured in a short length of time include not only the measurement points 5 on the road surface 3 but also the measurement points 5 on the wall surface of the tunnel 2. In this way, the multiple measurement coordinate points $P_{1i}$ in one transverse plane 6 can be corrected entirely with high accuracy. In other words, the transverse plane 6 recognized in the measurement can be corrected to a true transverse plane 6C with high accuracy.

(Conclusion of Measurement Point Correcting Method)

Figure 15:
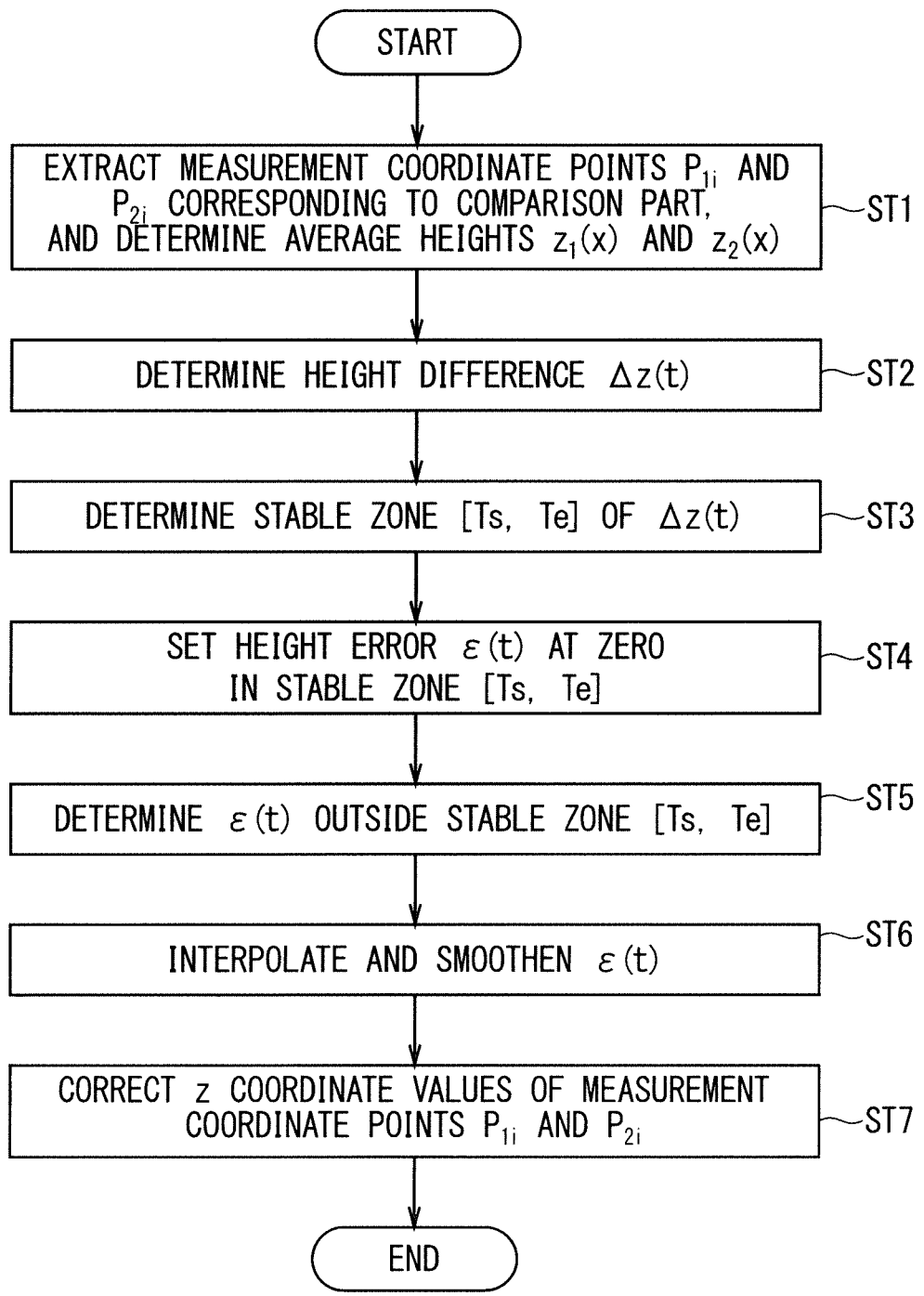
FIG. 15 is a flowchart showing operation of the structure measuring device according to the first embodiment of the present invention.

The following describes how the measurement point correcting device 17 performs the foregoing operation by referring to the measurement point correcting device 17 in FIG. 2 and the flowchart in FIG. 15.

In step ST1, the comparison part extracting unit 22 extracts measurement coordinate points $P_{1i}$ aligned in a linear shape as a first linear point cloud from the multiple measurement coordinate points $P_{1i}$ determined by the first laser scanner 14. This linear point cloud is extracted as a comparison part corresponding to the linear part x on the road surface 3. Then, an average height $z_1$(x) of the extracted measurement coordinate points $P_{1i}$ is calculated about each linear part x. Likewise, measurement coordinate points $P_{2i}$ aligned in a linear shape are extracted as a second linear point cloud from the multiple measurement coordinate points $P_{2i}$ determined by the second laser scanner 15. This linear point cloud is extracted as a comparison part corresponding to the linear part x on the road surface 3. Then, an average height $z_2$(x) of the extracted measurement coordinate points $P_{2i}$ is calculated about each linear part x.

The linear point clouds are extracted as follows, for example. First, measurement coordinate points measured continuously under the measuring vehicle 1 during each scanning are defined as one group. An approximate straight line is calculated for each group, and a point deviated from the calculated approximate straight line by a value larger than a predetermined value is removed as noise, If the noise has a magnitude greater than a predetermined magnitude (in other words, if there is large fluctuation in height), an approximate straight line is calculated again and a point deviated from the calculated approximate straight line by a value larger than a predetermined value is removed as noise. This process is repeated according to situations. Measurement coordinate points finally left unremoved after implementation of the foregoing process (in other words, measurement coordinate points having been used for calculation of a final approximate straight line) are determined to be the linear point cloud.

In step ST2, the difference calculating unit 23 calculates a difference between the linear point cloud of the measurement coordinate points $P_{1i}$ corresponding to measurement of the linear part x and the linear point cloud of the measurement coordinate points $P_{2i}$ corresponding to measurement of the same linear part x. More specifically, by using the result obtained in step ST1 mentioned above, the function $\Delta z(x)$ is determined as follows: $z_2(x)-z_1(x)$. Namely, a difference between an average height acquired through measurement of one linear part x by the first laser scanner 14 and an average height acquired through measurement of the same linear part x by the second laser scanner 15 is calculated. Then, $\Delta z(x)$ is transformed into $\Delta z(t)$. The time t used in this example is a time when the linear part x is measured by the first laser scanner 14.

In step ST3, the error calculating unit 24 extracts the stable zone [Ts, Te] as a zone of the time t in which the function $\Delta z(t)$ has a value of substantially zero. In step ST4, the error calculating unit 24 sets the height error $\varepsilon(t)$ at a value of zero about the time t in the stable zone 30.

In step ST5, the error calculating unit 24 calculates error having time dependence included in the measurement coordinate point $P_{1i}$ and the measurement coordinate point $P_{2i}$ on the basis of $\Delta z(t)$ indicating the difference between the linear point cloud of the measurement coordinate points $P_{1i}$ and the linear point cloud of the measurement coordinate points $P_{2i}$. More specifically, operation of adding $\Delta z(t)$ to $\varepsilon(t)$ is performed on the basis of $\varepsilon(t)=0$ about the time t in the stable zone 30, thereby determining $\varepsilon(t+\Delta t)$. Further, operation of adding $-\Delta z(t)$ $(t-\Delta t)$ to $\varepsilon(t)$ is performed, thereby determining $\varepsilon(t-\Delta t)$. Such operations are repeated to determine the function $\varepsilon(t)$ for a range covering all the required times t. In step ST6, the error calculating unit 24 interpolates and smoothens the resultant function $\varepsilon(t)$.

In step ST7, the coordinate value correcting unit 25 corrects the measurement coordinate point $P_{1i}$ and the measurement coordinate point $P_{2i}$ on the basis of the height error $\varepsilon(t)$. More specifically, the height error $\varepsilon(\tau_{1i})$ occurring at the time of measurement of the measurement coordinate point $P_{1i}$ is subtracted from the z coordinate of this measurement coordinate point $P_{1i}$. Further, the height error $\varepsilon(\tau_{2i})$ occurring at the time of measurement of the measurement coordinate point $P_{2i}$ is subtracted from the z coordinate of this measurement coordinate point $P_{2i}$.

As a result of the foregoing, height error in the measurement coordinate points determined by the first laser scanner 14 and the second laser scanner 15 is corrected.

(Conclusion of Effect)

According to the structure measuring device of this embodiment, the common linear part x on the road surface 3 is recognized as the first linear point cloud on the first measurement surface 26 at the time $t_1$, and is recognized as the second linear point cloud on the second measurement surface 28 at the time $t_2$. Then, the difference $\Delta z(x)$ in average height between the first linear point cloud and the second linear point cloud corresponding to the common linear part x is calculated. The average heights $z_1(x)$ and $z_2(x)$ of the first linear point cloud and the second linear point cloud respectively are determined with the height error $\varepsilon(t_1)$ at the time $t_1$ and the height error $\varepsilon(t_2)$ at the time $t_2$, respectively, relative to a true average height $z^*(x)$ of the sensed linear part x. Thus, the difference $\Delta z(x)$ in average height between the first linear point cloud and the second linear point cloud indicates a difference between the height error $\varepsilon(t_1)$ at the time $t_1$ and the height error $\varepsilon(t_2)$ at the time $t_2$. If the speed of the measuring vehicle 1 is known, a shift $\Delta t$ between the time $t_1$ and the time $t_2$ is also known. In this way, by using $\Delta z(t)$, it becomes possible to know a difference between height error $\varepsilon(t)$ at a particular time t and height error $\varepsilon(t\pm\Delta t)$ at a time shifted from the particular time t by the known length of time $\Delta t$. As a result, the height error $\varepsilon(t)$ having time dependence can be known on the basis of the data $\Delta z(t)$ having time dependence about the difference in average height between the first linear point cloud and the second linear point cloud. By correcting the height error $\varepsilon(t)$ known in this way, the measurement coordinate points $P_{1i}$ and $P_{2i}$ indicating the geometry of a surface of a structure can be given higher accuracy.

As described above, in this embodiment, the height error $\varepsilon(t)$ is calculated as error having time dependence included in the measurement coordinate points $P_{1i}$ and $P_{2i}$. This makes it possible to reduce the height error $\varepsilon(t)$, which is error to particularly occur as measurement error in the MMS. In particular, the average height $z_1(x)$ of the first linear point cloud and the average height $z_2(x)$ of the second linear point cloud are calculated. By using a result of this calculation, the height error $\varepsilon(t)$ can be calculated easily.

A normal vector to each of the first measurement surface 26 and the second measurement surface 28 has a component of zero along the right-left axis of the measuring vehicle 1. This allows each of the first laser scanner 14 and the second laser scanner 15 to scan a linear part on the road surface 3 orthogonal to a traveling direction. By doing so, correction can be made with higher accuracy. Preferably, the first measurement surface 26 of the first laser scanner 14 is orthogonal to the front-back axis 27 of the measuring vehicle 1. This makes it possible to reduce influence of unexpected attitude change of the measuring vehicle 1 over measurement by the first laser scanner 14. More preferably, a normal vector to the second measurement surface 28 is tilted about 30 degrees from the front-back axis 27 of the measuring vehicle 1. This makes it possible to reduce influence of drift error occurring at the position and attitude sensor.

According to the measurement point correcting device 17 and the measurement point correcting method using the measurement point correcting device 17 of this embodiment, if the common linear part x on the road surface 3 is recognized on the first measurement surface 26 at the time $t_1$ as the first linear point cloud and is recognized on the second measurement surface 28 at the time $t_2$ as the second linear point cloud, the difference $\Delta z(x)$ in average height between the first linear point cloud and the second linear point cloud corresponding to the common linear part x is calculated. The average heights $z_1(x)$ and $z_2(x)$ of the first linear point cloud and the second linear point cloud are determined with the height error $\varepsilon(t_1)$ at the time $t_1$ and the height error $\varepsilon(t_2)$ at the time $t_2$, respectively, relative to the true average height $z^*(x)$ of the sensed linear part x. Thus, the difference $\Delta z(x)$ in average height between the first linear point cloud and the second linear point cloud indicates a difference between the height error $\varepsilon(t_1)$ at the time $t_1$ and the height error $\varepsilon(t_2)$ at the time $t_2$. If the speed of the measuring vehicle 1 is known, the shift $\Delta t$ between the time $t_1$ and the time $t_2$ is also known. In this way, by using $\Delta z(t)$, it becomes possible to know a difference between the height error $\varepsilon(t)$ at a particular time t and the height error $\varepsilon(t\pm\Delta t)$ at a time shifted from the particular time t by the known length of time $\Delta t$. As a result, the height error $\varepsilon(t)$ having time dependence can be known on the basis of the data $\Delta z(t)$ having time dependence about the difference in average height between the first linear point cloud and the second linear point cloud. By correcting the height error $\varepsilon(t)$ known in this way, the measurement coordinate points $P_{1i}$ and $P_{2i}$ indicating the geometry of a surface of a structure can be given higher accuracy.

(Modifications of Comparison Part Extracting Unit and Difference

In the foregoing embodiment, the comparison part extracting unit 22 extracts the first and second point clouds indicating a linear part. Meanwhile, as long as the comparison part extracting unit 22 is configured to extract the first and second comparison point clouds indicating a comparison part, this comparison part is not limited to a linear part. Additionally, in the foregoing embodiment, the difference calculating unit 23 calculates a difference between an average height of the first linear point cloud and an average height of the second linear point cloud. Meanwhile, as long as the difference calculating unit 23 is configured to calculate a difference between the height of the first comparison point cloud and the height of the second comparison point cloud, a difference to be calculated is not limited to the difference between the average heights. The following describes an example of operation not including calculation of the respective average heights of the first and second linear point clouds by referring again to the flowchart in FIG. 15.

In step ST1 mentioned above, the comparison part extracting unit 22 extracts at least one first comparison point cloud corresponding to a comparison part on the road surface 3 from multiple measurement coordinate points determined by the first laser scanner 14. Like in the example described in the foregoing embodiment, for example, a measurement coordinate point can be extracted from a range from 2.75 to 3.5 m in the right-left direction of the measuring vehicle 1 covering the center of the measuring vehicle 1. Here, m measurement coordinate points $P_{1i}$ to $P_{1m}$ are extracted as the first comparison point cloud. Next, the comparison part extracting unit 22 extracts at least one measurement coordinate point $P_{2j}$ as a comparison point cloud from multiple measurement coordinate points determined by the second laser scanner 15. This extracted measurement coordinate point $P_{2j}$ is most approximate to one measurement coordinate point $P_{1i}$ of the measurement coordinate points $P_{1i}$ to $P_{1m}$.

In step ST2 mentioned above, the difference calculating unit 23 calculates a height difference $\Delta z$ between the measurement coordinate point $P_{1i}$ and the measurement coordinate point $P_{2j}$. The calculated height difference is expressed as a function of the measurement time $\tau_{1i}$ of the measurement coordinate point $P_{1i}$ to establish the relationship of $\Delta z(\tau_{1i})=z_{2j}-z_{1i}$. The measurement coordinate point $P_{2j}$ selected from the multiple measurement coordinate points determined by the second laser scanner 14 is a point most approximate to the measurement coordinate point $P_{1i}$. Thus, on condition that there is no measurement error, the height of the measurement coordinate point $P_{2j}$ becomes substantially equal to the height of the measurement coordinate point $P_{1i}$. In the presence of measurement error, $\Delta z(\tau_{1i})$ indicates a difference between the height error $\varepsilon(\tau_{1i})$ in the measurement coordinate point $P_{1i}$ and the height error $\varepsilon(\tau_{2j})$ in the measurement coordinate point $P_{2j}$. A difference between the measurement coordinate point $P_{1i}$ and the measurement coordinate point $P_{2i}$ is substantially equal to measurement error at maximum, so that the measurement coordinate point $P_{1i}$ and the measurement coordinate point $P_{2i}$ are assumable to be points acquired through measurement of measurement points on the road surface 3 substantially equal to each other. Thus, the difference $\tau_{2j}-\tau_{1i}$ between measurement times is assumable to be equal to the difference $\Delta t$ between times of measurement by the first laser scanner 14 and the second laser scanner 15 about the linear part x described in the foregoing embodiment.

As described above, the relationship of $\Delta z(\tau_{1i})=\varepsilon(\tau_{1i}+\Delta t)-\varepsilon(\tau_{1i})$ is satisfied. A formula of $\Delta z(t)=\varepsilon(t+\Delta t)-\varepsilon(t)$ similar to that given in the foregoing embodiment can be acquired by replacing $\tau_{1i}$ with the time t. In this way, the function $\varepsilon(t)$ can also be calculated in this modification.

In the foregoing operation, $\Delta z(t)$ is calculated using one measurement coordinate point $P_{1i}$. Hence, it becomes likely that $\Delta z(t)$ will disagree with the difference $\varepsilon(t+\Delta t)-\varepsilon(t)$ in height error for reason that there happens to be noise during measurement of the measurement coordinate point $P_{1i}$, for example. In this case, the accuracy in calculating the function $\varepsilon(t)$ may be reduced. In this regard, if m is two or more, instead of using only a value calculated for one measurement coordinate point $P_{1i}$, respective values of $\Delta z(t)$ calculated for corresponding ones of the m measurement coordinate points $P_{1i}$ to $P_{1m}$ may be averaged for higher calculation accuracy. For this averaging, what is called moving averaging process is employed for obtaining an average of values of $\Delta z(t)$ within a constant range in which t takes approximate values. By determining a value of $\Delta z(t)$ as an average of $\Delta z(t)$ and its approximate values, influence of noise, etc. is reduced. By doing so, the function $\varepsilon(t)$ is calculated with increased accuracy. Assuming that this process is averaging in a range within a cycle of scanning by the laser scanner, this process is to obtain an average of $\Delta z(t)$ corresponding to measurement coordinate points in a linear part, and this average is substantially equal to a difference in average height between linear point clouds described in the first embodiment. Thus, the function $\varepsilon(t)$ is calculated with accuracy approximate to the accuracy achieved by the first embodiment. Instead of employing the moving average process, some of measurement coordinate points and including two or more measurement coordinate points may be subjected to averaging using $\Delta z(t)$. These two or more measurement coordinate points are not limited to those measured continuously.

This modification makes it possible to correct a measurement coordinate point without the need of performing the process of calculating an average height about a pair of measurement coordinate points forming one linear point cloud.

(Other Modifications)

In the foregoing embodiment, the first measurement surface 26 of the first laser scanner 14 is orthogonal to the front-back axis 27 of the measuring vehicle 1, and the second measurement surface 28 of the second laser scanner 15 is tilted frontward or backward from the vertical direction. However, these are not the only directions of the first laser scanner 14 and the second laser scanner 15.

In the foregoing embodiment, the measuring vehicle 1 is equipped with the GPS receiver 12. However, the GPS receiver 12 is not an absolute necessity. In particular, the GPS receiver 12 cannot be used for measurement in the tunnel 2. Thus, if purpose is dedicated to measurement in a tunnel, a sensor other than the GPS receiver 12 is used more usefully as the position and attitude sensor.

In FIG. 1 referred to in the foregoing embodiment, the measurement coordinate point calculating unit 16 and the measurement point correcting device 17 are installed on the measuring vehicle 1. Alternatively, the measurement point correcting device 17 may be separated from the measuring vehicle 1. The measurement coordinate point calculating unit 16 may further be separated from the measuring vehicle 1. In such cases, the measuring vehicle 1 is provided with an output data storage unit in which output data from the position and attitude sensor, the laser scanner, etc. is stored once. After measurement is finished, the output data is transferred to the measurement coordinate point calculating unit 16 and the measurement point correcting device 17. Alternatively, output data from the position and attitude sensor, the laser scanner, etc. may be transmitted on an as needed basis to the measurement coordinate point calculating unit 16 and the measurement point correcting device 17 through radio communication or using a calculator network system.

The measurement coordinate point calculating unit 16 and the measurement point correcting device 17 may be configured to operate as application software in a personal computer, for example. An embodiment employing such a configuration will be described in detail later.

In the foregoing embodiment, a group of the first measurement coordinate points $P_{1i}$ determined by the first laser scanner 14 and a group of the second measurement coordinate points $P_{2i}$ determined by the second laser scanner 105 are both subjected to correction. Alternatively, one of these groups may be subjected to correction. In this case, a correction target is preferably a group of the first measurement coordinate points $P_{1i}$ determined by the first laser scanner 14 having the first measurement surface 26 orthogonal to the front-back axis 27 of the measuring vehicle 1. The reason for this is that the measurement coordinate point $P_{1i}$ on the first measurement surface 26 is unlikely to cause error in the attitude of the measuring vehicle 1, particularly, error in yaw and error in pitch, to develop as unevenness in a measurement result about an inner wall surface of the tunnel 2.

In the foregoing embodiment, a linear part extends along a straight line. However, the linear part is not always required to be a straight line. Meanwhile, a linear part extending along a straight line facilitates data processing further without the need of performing complicated approximation process, for example.

In the foregoing embodiment, a linear part to be used exists on the road surface 3. However, other linear parts may be used. In particular, for measurement of a tunnel in which almost devoid of facilities, a linear part on a ceiling of the tunnel 2 may be used. In particular, if the tunnel has a box culvert shape, a linear part along a straight line orthogonal to the x axis can also be provided on a ceiling section.

While measurement of the tunnel 2 has been described in detail in the foregoing embodiment, a target of measurement is not limited to tunnels but similar operation can be performed for measurement of general structures such as road surfaces and bridges. For example, facilities along railroads may be subjected to measurement. In the case of a railway, as a result of the presence of tracks on a road surface, attention is given to a flat region on the road surface for using a linear part along a straight line. If a track bed is slab tracks made of concrete, for example, a linear part is set within the width of the tracks. In the case of ballast tracks, a linear part on a crosstie within the width of the tracks may be used. To achieve this, fluctuation in height of measurement coordinate points at a linear part within the width of tracks may be calculated for each scanning. If the calculated fluctuation is less than a predetermined value, this scanning may be determined to be done on the linear part on a crosstie. Alternatively, in the case of a railway, attention may be given to a platform in a station as a linear part.

Second Embodiment

In the foregoing first embodiment, the height error $\varepsilon(t)$ in a measurement coordinate point due to vertical vibration of the measuring vehicle 1 is corrected. In a second embodiment, error in tilt around the front-back axis 27 of the measuring vehicle 1, namely, roll error $\rho(t)$ is further corrected. A method of this correction will be described below. The basic configuration of a structure measuring device (FIGS. 1 to 4) is substantially the same as that of the first embodiment or those of its modifications. Hence, if necessary, the drawings referred to in the first embodiment will also be used in the following description.

The position and attitude sensor measures a vehicle position Q(t) of the measuring vehicle 1 at a time t. The position Q(t) includes the three-dimensional coordinates a vehicle origin of the measuring vehicle 1 at the time t. The vehicle origin, namely, a reference position of the measuring vehicle 1 may be an origin position of the inertial sensor 13, for example. The measured Q(t) is stored into the storage unit 21 of the measurement point correcting device 17 (FIG. 2).

Figure 16:
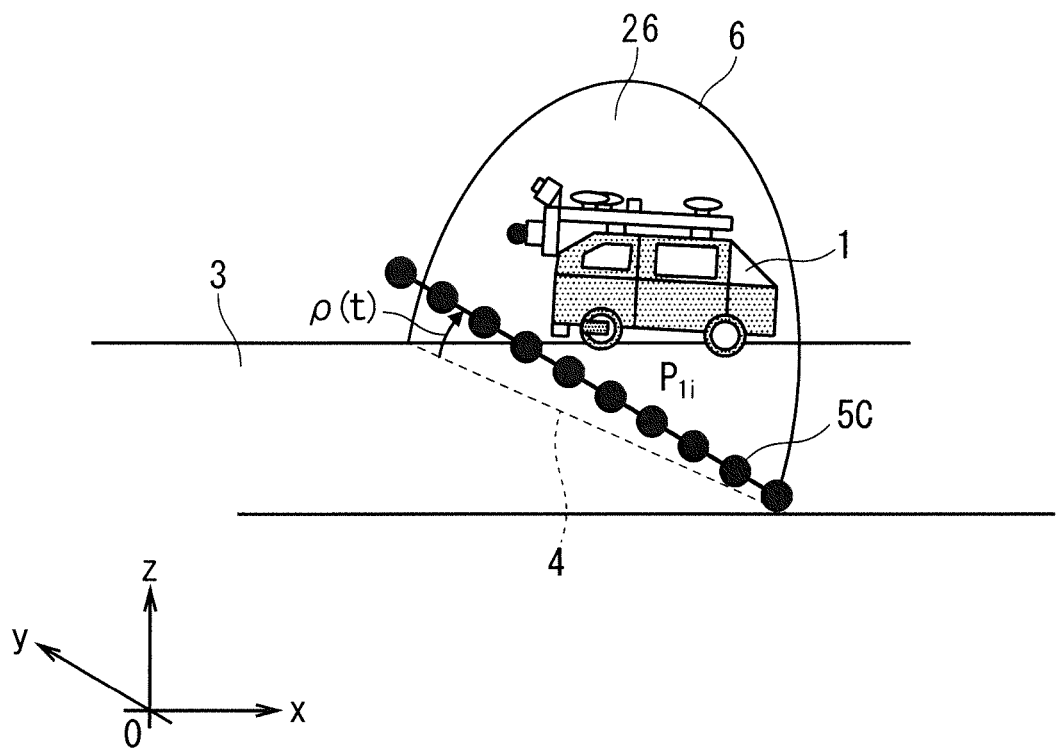
FIG. 16 is a perspective view explaining roll error in a measurement coordinate point determined by a first point cloud sensor belonging to a structure measuring device according to a second embodiment of the present invention.

FIG. 16 is a perspective view explaining roll error in the measurement coordinate point $P_{1i}$ determined by the laser scanner 14. If there are different forms of unevenness on the road surface 3 at the right and left wheel positions of the measuring vehicle 1, sideway tilt (roll) occurs in the attitude of the measuring vehicle 1. If a roll value changes more finely than a cycle of measurement by the position and attitude sensor, information from the position and attitude sensor is not sufficient for acquiring a true roll value with high accuracy at every time t. This makes the roll error $\rho(t)$ not ignorable in a measured value from the laser scanner at the time t. More specifically, a measurement point at the time t to be measured by the laser scanner becomes a coordinate value rotated from a true coordinate value by the roll error $\rho(t)$ around the front-back axis 27 of the measuring vehicle 1, in other words, around the x direction corresponding to a tunnel axis direction. As a result of the roll error $\rho(t)$, a linear point cloud 5C calculated through sensing of measurement points on the linear part 4 on the road surface 3 is aligned in a direction tilted by the roll error $\rho(t)$ from a direction in which the linear part 4 extends.

Figure 17:
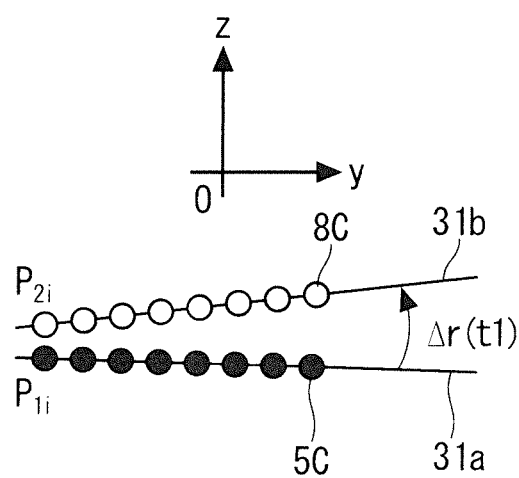
FIG. 17 is a schematic view explaining a relationship between roll error caused by the first point cloud sensor and roll error caused by a second point cloud sensor belonging to the structure measuring device according to the second embodiment of the present invention.

FIG. 17 is a schematic view explaining a relationship between roll error caused by the first laser scanner 14 and roll error caused by the second laser scanner 15. The first laser scanner 14 and the second laser scanner 15 scan the same linear part x on the road surface 3 to acquire a linear point cloud 5C of multiple points and a linear point cloud 8C of multiple points.

It is assumed that a true value of a roll value about the linear part x is defined as r*(x), a roll value calculated from the measurement coordinate point $P_{1i}$ determined by the first laser scanner 14 and a roll value calculated from the measurement coordinate point $P_{2i}$ determined by the second laser scanner 15 are defined as $r_1(x)$ and $r_2(x)$ respectively, and the linear part x is measured at a time $t_1$ and a time $t_2$ by the first laser scanner 14 and the second laser scanner 15 respectively. In this case, the following relationships are established:

$$r_1(x) = r^*(x) + \rho(t_1);\text{ and}$$

$$r_2(x) = r^*(x) + \rho(t_2).$$

The element $r_1(x)$ is represented by the tilt or angle of an approximate straight line 31a when the approximate straight line 31a is used for approximation of the linear point cloud 5C, for example. For this process, an x coordinate component of the linear point cloud 5C is ignored. In other words, the foregoing approximation process is performed and the tilt (angle) is calculated using a coordinate point acquired by projecting the linear point cloud 5C on the yz plane. Likewise, $r_2(x)$ is represented by the tilt or angle of an approximate straight line 31b when the approximate straight line 31b is used for approximation of the linear point cloud 8C, for example. Assuming that a difference of $r_2(x)$ from $r_1(x)$ is $\Delta r(x)$, the following relationship is established:

$$\Delta r(x)=r_2(x)-r_1(x)=\rho(t_2)-\rho(t_1).$$

In the first embodiment, replacement of the function $\Delta z(x)$ relating to x with the function $\Delta z(t)$ relating to t has been described. Here, the function $\Delta r(x)$ relating to x is also replaced with the function $\Delta r(t)$ relating to t. By doing so, the following relationship is derived:

$$\Delta r(t_1)=\rho(t_2)-\rho(t_1).$$

The left side $\Delta r(t_1)$ can be calculated from a roll value $r(t_1)$ obtained from the measurement coordinate point $P_{1i}$ determined by the first laser scanner 14 and a roll value $r(t_2)$ obtained from the measurement coordinate point $P_{2i}$ determined by the second laser scanner 15. In a situation shown in FIG. 17, the roll error $\rho(t)$ changes depending on time to generate a difference of $\Delta r(t_1)$ between a tilt of a row of measurement coordinate points determined by the first laser scanner 14 and a tilt of a row of measurement coordinate points determined by the second laser scanner 15 about the same linear part x.

The roll error $\rho(t)$ is calculated by a method substantially the same as the method of calculating the height error $\varepsilon(t)$ described in detail in the first embodiment. More specifically, a zone [Trs, Tre] of the time t is extracted using the function $\Delta r(t)$ in which $\Delta r(t)=0$ is established for a length of time sufficiently longer than a difference between lengths of time when the first laser scanner 14 and the second laser scanner 15 measure the same linear part. This zone is also called a stable zone about $\Delta r(t)$. In the stable zone, the roll error $\rho(t)$ does not change. Thus, the roll error $\rho(t)$ is represented by a constant in the stable zone. Meanwhile, for the same reason as that for regarding the height error $\varepsilon(t)$ as zero in the first embodiment, $\rho(t)$ can be regarded as zero (Trs≤t≤Tre). The function $\rho(t)$ is calculated by the same method as that for determining the function $\varepsilon(t)$. More specifically, $\rho(t_2)$ is calculated as $\rho(t_1)+\Delta r(t_1)$ on the basis of $\rho(t_1)=0$ in a range of Trs≤$t_1$≤Tre. Further, $\rho(t_1)$ is calculated as $\rho(t_2)-\Delta r(t_1)$ on the basis of $\rho(t_2)=0$ in a range of Trs≤$t_2$≤Tre.

The function $\rho(t)$ can be calculated using the foregoing algorithm. Like in the case of the function $\varepsilon(t)$, multiple stable zones may be selected and the function $\rho(t)$ may be determined in front of and behind each of the stable zones. The resultant function $\rho(t)$ may be subjected to filtering process such as smoothing for noise reduction.

Figure 18:
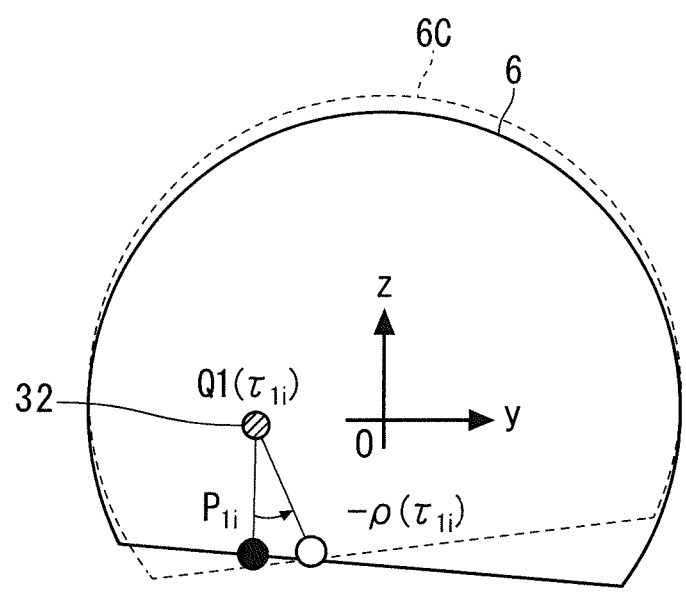
FIG. 18 is a front view explaining a method of correcting roll error in a measurement coordinate point during operation of the structure measuring device according to the second embodiment of the present invention.

FIG. 18 is a front view explaining a method of correcting roll error in the measurement coordinate point $P_{1i}$ determined by the first laser scanner 14. As the roll error $\rho(t)$ is calculated by the foregoing method, the correction is made to remove this error from each measurement coordinate point PH determined by the first laser scanner 14. Here, the x axis extends in the front-back axis 27 of the measuring vehicle 1. Thus, the roll error is removed by rotational transformation of $-\rho(t)$ with respect to a vehicle position 32 on the yz plane as a center. This rotational transformation of a certain measurement coordinate point P is expressed as R(t){P}, and a vehicle position at the time t is defined as Q(t). This position Q(t) includes height error. Roll correction of the measurement coordinate point $P_{1i}$ is made as follows:

$$P_{1i} \leftarrow R(\tau_{1i})\{P_{1i}-Q(\tau_{1i})\}+Q(\tau_{1i}).$$

Further, correction of this z coordinate value, namely, correction of the height error $\varepsilon(t)$ is made as follows:

$$z_{1i} \leftarrow z_{1i}-\varepsilon(\tau_{1i}).$$

Likewise, the measurement coordinate point $P_{2i}$ determined by the second laser scanner 15 is corrected first as follows:

$$P_{2i} \leftarrow R(\tau_{2i})\{P_{2i}-Q(\tau_{2i})\}+Q(\tau_{2i}).$$

Next, correction is made as follows:

$$z_{2i} \leftarrow z_{2i}-\varepsilon(\tau_{2i}).$$

As a result of the foregoing, correction of the roll value and correction of the height of a measurement coordinate point are finished. FIG. 18 particularly shows correction of the roll error $\rho(\tau_{1i})$ in the measurement coordinate point $P_{1i}$ on the road surface 3 (FIG. 16) determined by the first laser scanner 14 at a time of measurement $\tau_{1i}$ of this measurement coordinate point $P_{1i}$. As a result of the rotational transformation, a measurement coordinate point before the correction (in the drawing, a black circle) is transformed to a measurement coordinate point after the correction (in the drawing, a white circle). Further, not only a measurement coordinate point on the road surface 3 but also multiple measurement coordinate points in one transverse plane 6 can be corrected entirely with high accuracy. In other words, the measured transverse plane 6 can be corrected with high accuracy to a transverse plane 6C having higher properness.

Figure 19:
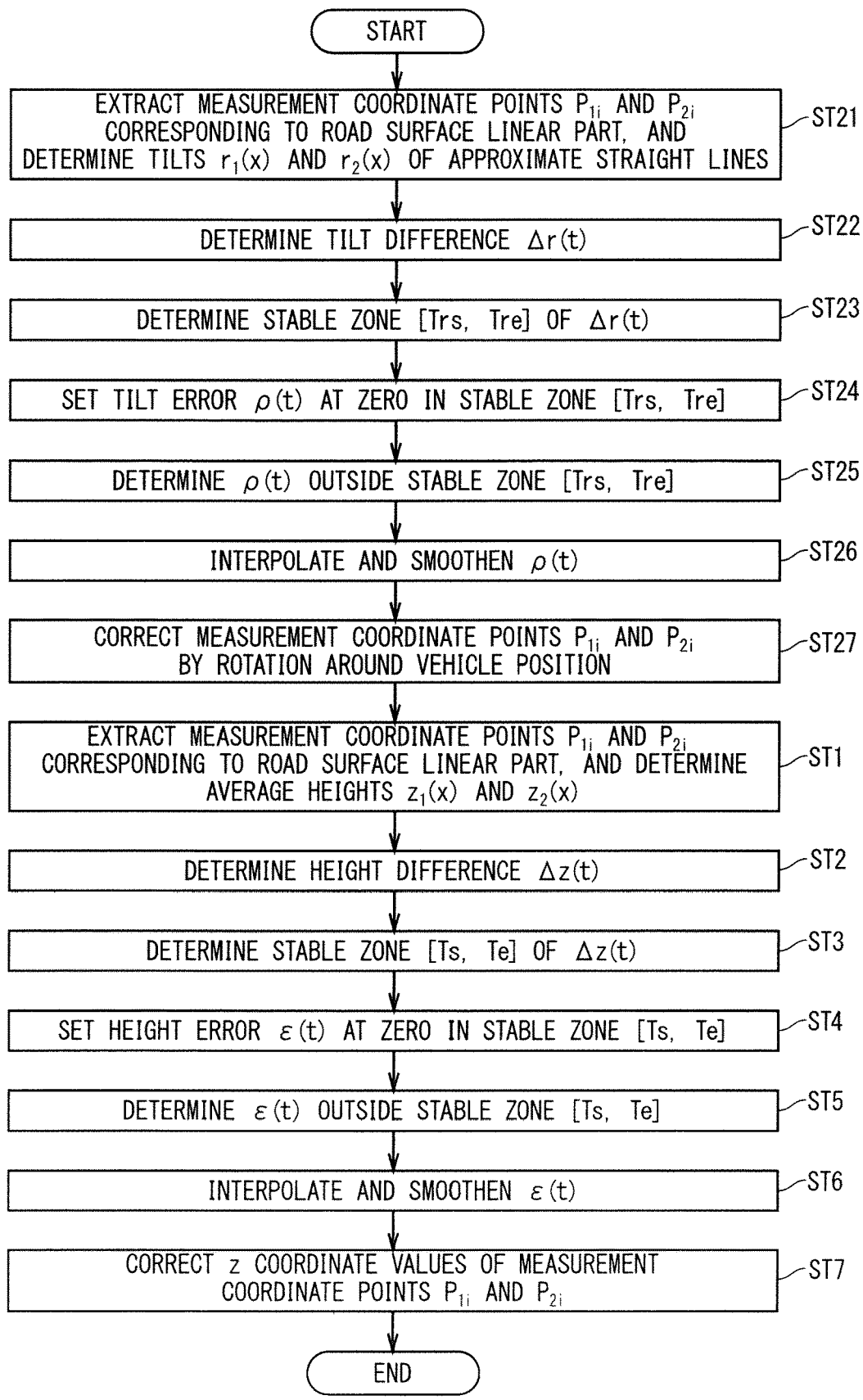
FIG. 19 is a flowchart showing operation of the structure measuring device according to the second embodiment of the present invention.

The following describes how the measurement point correcting device 17 performs the foregoing operation by referring to the measurement point correcting device 17 (FIG. 2) and the flowchart in FIG. 19. In this embodiment, after the roll error $\rho(t)$ is corrected, the height error $\varepsilon(t)$ is corrected by the same method as that in the first embodiment. A similar step to that of the first embodiment 1 is identified by the same sign and will not be described.

In step ST21, the comparison part extracting unit 22 extracts measurement coordinate points (a first linear point cloud as a first comparison point cloud) corresponding to the linear part x on the road surface 3 about each scanning from the measurement coordinate points $P_{1i}$ determined by the first laser scanner 14. The extracted first linear point cloud is approximated using the approximate straight line 31a (FIG. 17) in the yz plane. A tilt of the approximate straight line 31a is calculated as the roll value $r_1(x)$. Likewise, measurement coordinate points (a second linear point cloud as a second comparison point cloud) corresponding to the linear part x on the road surface 3 about each scanning are extracted from the measurement coordinate point $P_{2i}$ determined by the second laser scanner 15. The extracted second linear point cloud is approximated using the approximate straight line 31b (FIG. 17) in the yz plane. A tilt of the approximate straight line 31b is calculated as the roll value $r_2(x)$.

In step ST22, the difference calculating unit 23 calculates the function $\Delta r(x)$ as $r_2(x)-r_1(x)$. Namely, a difference between a roll value determined through measurement of the linear part x by the first laser scanner 14 and a roll value determined through measurement of the same linear part x by the second laser scanner 15 is calculated. Then, $\Delta r(x)$ is transformed into $\Delta r(t)$. The time t used in this example is a time when the linear part x is measured by the first laser scanner 14.

In step ST23, the error calculating unit 24 extracts the stable zone [Trs, Tre] corresponding to a zone of the time t in which the function $\Delta r(t)$ has a value of substantially zero. In step ST24, the error calculating unit 24 sets the function $\rho(t)$ at a value of zero about the time t in the stable zone [Trs, Tre].

In step ST25, the error calculating unit 24 performs operation of adding $\Delta \rho(t)$ to $\rho(t)$ on the basis of $\rho(t)=0$ about the time t in the foregoing stable zone, thereby determining ρ(t+Δt). Further, operation of adding −Δρ(t) (t−Δt) to ρ(t) is performed, thereby determining ρ(t−Δt). Such operations are repeated to determine the roll error ρ(t) having time dependence included in the measurement coordinate point $P_{1i}$ and the measurement coordinate point $P_{2i}$ for a range covering all the required times t. In step ST26, the error calculating unit 24 interpolates and smoothens the resultant function ρ(t).

In step ST27, the coordinate value correcting unit 25 corrects roll error in the measurement coordinate point $P_{1i}$ determined by the first laser scanner 14 and roll error in the measurement coordinate point $P_{2i}$ determined by the second laser scanner 15. More specifically, a coordinate value determined after correction of the roll error is calculated by the foregoing rotational transformation.

As a result of the foregoing, roll error in the measurement coordinate points determined by the first laser scanner 14 and the second laser scanner 15 is corrected. Next, by performing steps ST1 to ST7 in the same way as that of the first embodiment, height error is further corrected. Step ST21 and step ST1 are common in that these steps have the process of extracting a measurement coordinate point corresponding to the linear part x on the road surface 3 about each scanning. Thus, if a result of this process is stored, repeated implementation of the same process is omissible.

According to this embodiment, the roll error ρ(t) is calculated as error having time dependence included in a measurement coordinate point. Correcting the roll error ρ(t) makes it possible to increase accuracy of a measurement coordinate point indicating the geometry of a surface of a structure.

For calculation of the roll error ρ(t), a tilt of the approximate straight line 31a and a tilt of the approximate straight line 31b are calculated. The roll error ρ(t) can be calculated easily using results of the calculations. The approximate straight line 31a and the approximate straight line 31b correspond to a linear part on the road surface 3. Meanwhile, a measurement coordinate point is relatively proper in each transverse plane, so that roll of measurement coordinate points entirely in one transverse plane can be corrected properly by making correction in such a manner as to provide proper roll of the linear part entirely on the road surface 3.

Third Embodiment

In the foregoing first embodiment, the height error ε(t) in a measurement coordinate point due to vertical vibration of the measuring vehicle 1 is corrected. In a third embodiment, error in tilt around the right-left axis of the measuring vehicle 1, namely, pitch error φ(t) is corrected. A method of this correction will be described below. The basic configuration of a structure measuring device (FIGS. 1 to 4) is substantially the same as that of the first embodiment or those of its modifications. Hence, if necessary, the drawings referred to in the first embodiment will also be used in the following description.

Figure 20:
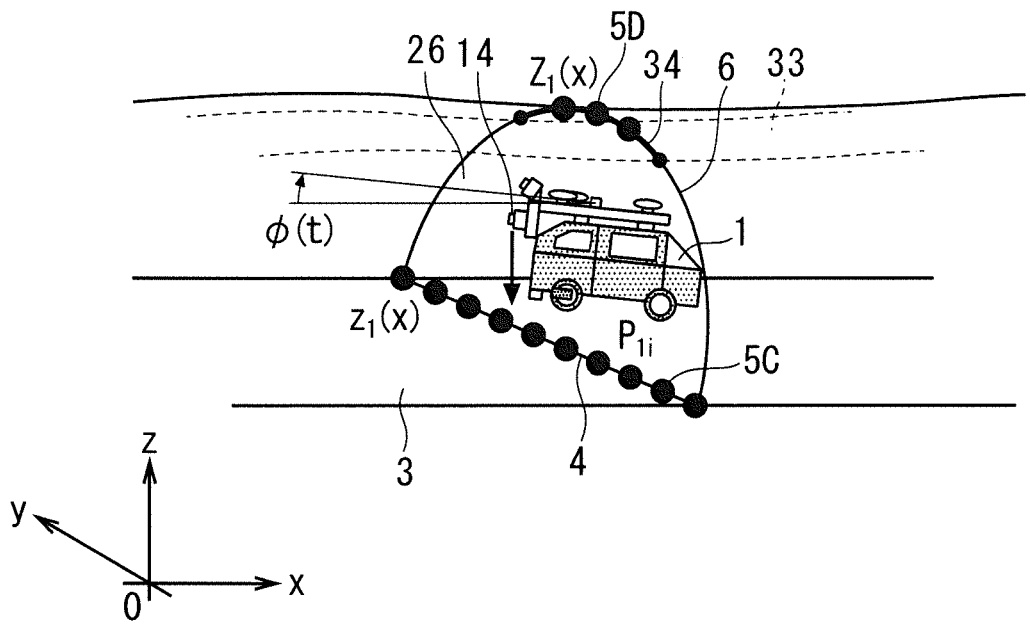
FIG. 20 is a perspective view explaining pitch error in a measurement coordinate point determined by a first point cloud sensor belonging to a structure measuring device according to a third embodiment of the present invention.
Figure 21:
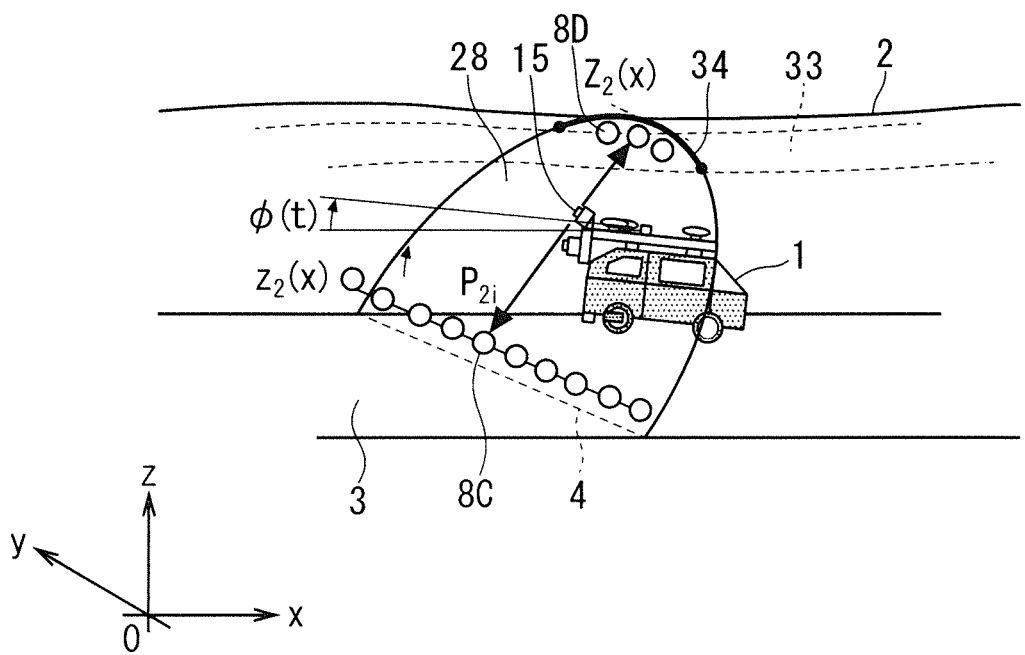
FIG. 21 is a perspective view explaining pitch error in a measurement coordinate point determined by a second point cloud sensor belonging to the structure measuring device according to the third embodiment of the present invention.

FIGS. 20 and 21 are perspective views explaining pitch error in the measurement coordinate point $P_{1i}$ determined by the first laser scanner 14 and pitch error in the measurement coordinate point $P_{2i}$ determined by the second laser scanner 15 respectively. If there is fine unevenness on the road surface 3, the front and back wheels of the measuring vehicle 1 receive different influences from the unevenness to change tilt around the right-left axis (pitch). In other words, upward tilt (angle of elevation) or downward tilt (angle of depression) changes. If a pitch value changes more finely than a cycle of measurement by the position and attitude sensor, information from the position and attitude sensor is not sufficient for acquiring a pitch value with high accuracy at every time t. This makes the pitch error φ(t) not ignorable in a measured value from the laser scanner at the time t. More specifically, a measurement point at the time t to be measured by the laser scanner becomes a coordinate value rotated from a true coordinate value by the pitch error φ(t) around the right-left axis of the measuring vehicle 1, in other words, around the y direction corresponding to a tunnel width direction.

In the first and second embodiments, the comparison part extracting unit 22 (FIG. 2) extracts a linear point cloud corresponding to a linear part on the road surface 3 in the tunnel 2. In this embodiment, the comparison part extracting unit 22 further extracts a linear point cloud corresponding to a linear part on a tunnel wall surface for correction of pitch error. The linear part on the road surface 3 and the linear part on the tunnel wall surface are measured by each of the first laser scanner 14 and the second laser scanner 15, and the height error ε(t) and the pitch error φ(t) are calculated from a difference between results of these measurements.

A ceiling section 33 on a tunnel lining surface is selected as a linear part on a tunnel wall surface. A range of the ceiling section 33 to become a linear part is set to be equal to the width position of a linear part on the road surface 3, for example. In other words, a part vertically above the linear part on the road surface 3 is used as the linear part on the tunnel wall surface. In a tunnel having a rectangular sectional shape such as a box culvert shape, not only the linear part on the road surface 3 but also a linear part 34 on the ceiling section 33 has a straight line shape. In a tunnel having a substantially circular sectional shape, the linear part 34 has a shape like a curve, so that the linear part 34 may be defined in a narrower range.

As described in the first embodiment, the comparison part extracting unit 22 (FIG. 2) extracts a first linear point cloud aligned in a linear pattern as a first comparison point cloud from the measurement coordinate points $P_{1i}$, and extracts a second linear point cloud aligned in a linear pattern as a second comparison point cloud from the measurement coordinate points $P_{2i}$. As shown in FIG. 20, a first lower linear point cloud 5C corresponding to the linear part 4 on the road surface 3 and a first upper linear point cloud 5D corresponding to the linear part 34 on the ceiling section 33 are extracted as the first linear point cloud. As the first measurement surface 26 is vertical to a direction in which the tunnel 2 extends, measurement error due to the pitch error φ(t) is not serious and is not shown in the drawing. As shown in FIG. 21, a second lower linear point cloud 8C corresponding to the linear part 4 on the road surface 3 and a second upper linear point cloud 8D corresponding to the linear part 34 on the ceiling section 33 are extracted as the second linear point cloud. As the second measurement surface 28 is tilted from the direction in which the tunnel 2 extends, measurement error due to the pitch error φ(t) is likely to occur.

The following describes how the pitch error φ(t) influences a measurement result. A height from the road surface 3 to the ceiling section 33 is defined as H. If the measurement surface of the laser scanner forms an angle of θ together with a vertical plane, the height h(t) observed through one-rotation scanning at the time t is expressed as follows:

$$h(t) = \{H/\cos\theta\} \times \cos(\theta + \varphi(t)) \quad \text{[Formula 5]}$$
$$\approx \{H/\cos\theta\} \times \{\cos\theta + \varphi(t)\sin\theta\}$$
$$= H\{1 + \varphi(t)\tan\theta\}$$

The foregoing approximation is based on the assumption that the pitch error $\varphi(t)$ is substantially small. Further, the laser scanner makes measurement by one-rotation scanning within a considerably short length of time, so that a time of each scanning and pitch error in each scanning can be represented by t and $\varphi(t)$ in a pair.

Figure 22:
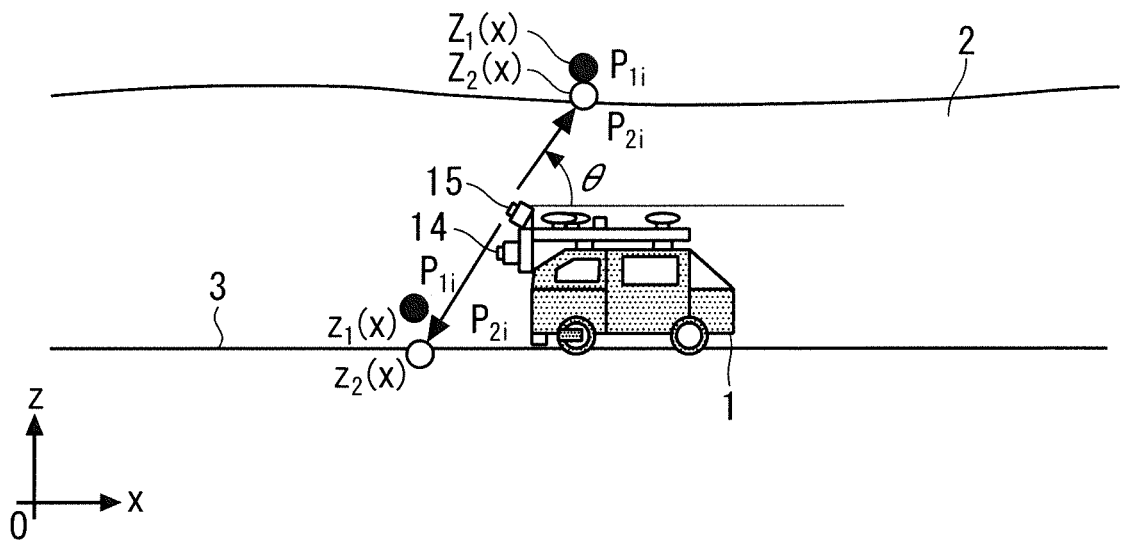
FIG. 22 is a side view explaining a difference between measurement coordinate points determined by the first point cloud sensor and the second point cloud sensor belonging to the structure measuring device according to the third embodiment of the present invention.

Referring to FIG. 22, as the first laser scanner 14 has the measurement surface orthogonal to the x axis, the angle $\theta$ is zero. Thus, the height h(t) calculated from the foregoing formula is not influenced by the pitch error $\varphi(t)$. Meanwhile, as the second laser scanner 15 has the measurement surface tilted from the x axis, the angel $\theta$ is not zero. Thus, the height h(t) calculated from the forgoing formula is influenced significantly by the pitch error $\varphi(t)$. Then, in this embodiment, a result of measurement by the second laser scanner 15 is compared to a result of measurement by the first laser scanner 14 to calculate the pitch error $\varphi(t)$, and pitch is corrected using the calculated pitch error $\varphi(t)$.

More specifically, as described in the first embodiment, a difference between the heights $z_1(x)$ and $z_2(x)$ of the same linear part x on the road surface 3 measured by the first laser scanner 14 and the second laser scanner 15 respectively is used to correct height error in the measurement coordinate points $P_{1i}$ and $P_{2i}$. In the following description, processing proceeds using the error in the measurement coordinate points $P_{1i}$ and $P_{2i}$ after the height correction. In other words, processing proceeds after height error in a measurement coordinate point on the road surface 3 is removed.

Figure 23:
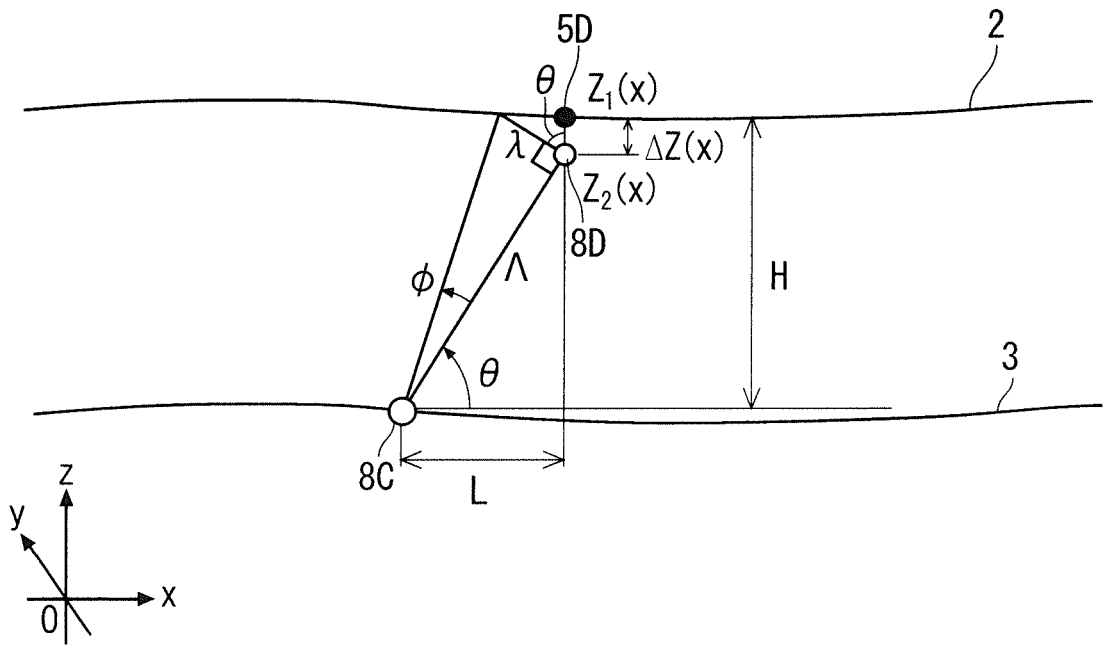
FIG. 23 is a side view explaining a method of calculating pitch error in a measurement coordinate point during operation of the structure measuring device according to the third embodiment of the present invention.

Referring to FIG. 23, the heights $Z_1(x)$ and $Z_2(x)$ of the same linear part 34 on the ceiling section 33 are measured from the measurement coordinate points $P_{1i}$ and $P_{2i}$ respectively. For example, the height $Z_1(x)$ is an average height of a row of the measurement coordinate points $P_{1i}$ corresponding to the linear part 34 on the ceiling section 33. This also applies to the height $Z_2(x)$. This method is applied particularly suitably to a tunnel having a box culvert shape in which the linear part 34 on the ceiling section 33 is a straight line. In the case of a general tunnel having a substantially circular sectional shape, a linear part on the ceiling section 33 may be approximated using a predetermined curve such as an arc, and the maximum height of this curve may be employed.

A difference of $Z_2(x)$ from the height $Z_1(x)$ is defined as $\Delta Z(x)$. Specifically, the following definition is given:

$$\Delta Z(x) = Z_2(x) - Z_1(x).$$

Further, a difference between the height position of the second lower linear point cloud 8C (FIG. 21) calculated through measurement of the linear part 4 on the road surface 3 included in the second measurement surface 28 covering the linear part 34 on the ceiling section 33 by the second laser scanner 15 and the height position of the first upper linear point cloud 5D (FIG. 20) calculated through measurement of the linear part 34 on the ceiling section 33 by the first laser scanner 14 is defined as a height H (FIG. 23). Additionally, a difference in the x direction between the second upper linear point cloud 8D (FIG. 21) calculated through measurement of the linear part 34 on the ceiling section 33 and the second lower linear point cloud 8C (FIG. 21) calculated through measurement of the linear part 4 on the road surface 3 using the same second measurement surface 28 (FIG. 21) is defined as a distance L (FIG. 23).

Figure 24:
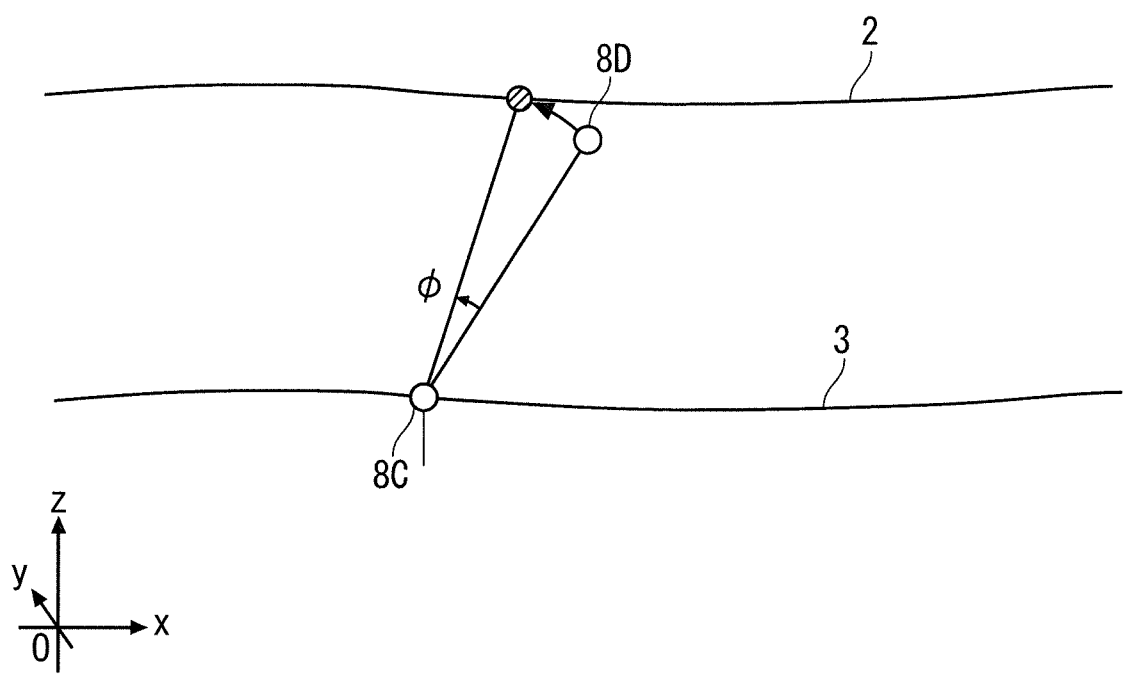
FIG. 24 is a side view explaining a method of correcting pitch error in a measurement coordinate point during operation of the structure measuring device according to the third embodiment of the present invention.

FIG. 24 is a side view showing a method of correcting pitch error in a measurement coordinate point. In this embodiment, $\Delta Z(x)$ is canceled by rotating the second upper linear point cloud 8D to the angle $\varphi$ about the second lower linear point cloud 8C. This method will be described in detail below.

By using the foregoing definition, the following formula is established according to the Pythagorean theorem:

$$\Lambda = \sqrt{L^2 + \{H - \Delta Z(x)\}^2}, \lambda = \frac{\Delta Z(x)}{\cos\theta} \quad \text{[Formula 6]}$$

Thus, if $\varphi$ is sufficiently small, $\varphi$ can be calculated as follows:

$$\varphi \approx \tan\varphi = \frac{\lambda}{\Lambda} = \frac{\Delta Z(x)}{\cos\theta\sqrt{L^2 + \{H - \Delta Z(x)\}^2}} \quad \text{[Formula 7]}$$

As described above, the measurement coordinate point $P_{1i}$ determined by the first laser scanner 14 is not influenced by pitch error, and the height of the second lower linear point cloud 8C corresponds to the height of a measurement coordinate point on the road surface 3 and has already been corrected. Thus, the height of the tunnel 2 is reflected properly in the height H (FIG. 23). The angle $\theta$ is the sum of an angle formed by the second measurement surface 28 together with a vertical plane at the time of installation of the second laser scanner 15 on the measuring vehicle 1 and an angle of the pitch of the measuring vehicle 1 recognized by the structure measuring device at a time $t_2$ when the second laser scanner 15 measures the linear part 34 (FIG. 21). As described above, the angle of the pitch recognized by the structure measuring device has pitch error $\varphi(t_2)$. Thus, the pitch error can be corrected by performing rotational transformation by the angle of $\varphi(t_2)$ around the y axis on measurement coordinate points determined by the first laser scanner 14 and the second laser scanner 15 after height error is corrected.

As shown in the drawing, the second upper linear point cloud 8D is rotated by $\varphi(t)$ around the y axis with respect to the second lower linear point cloud 8C measured by the same scanning as the second upper linear point cloud 8D. The measurement coordinate points $P_{2i}$ other than the second upper linear point cloud 8D are rotated in the same way. The pitch error $\varphi(t)$ used for the correction may be subjected to filtering process in advance such as smoothing.

The first laser scanner 14 can be subjected to the same correction. As described above, the measurement surface of the first laser scanner 14 is vertical and orthogonal to the x axis. Thus, pitch error has little influence on a height and thus a height between a linear part on the road surface 3 and a linear part on the ceiling section 33 is substantially unchanged. As a result, the probability of the reoccurrence of height error resulting from correction of this pitch error is substantially zero.

Figure 25:
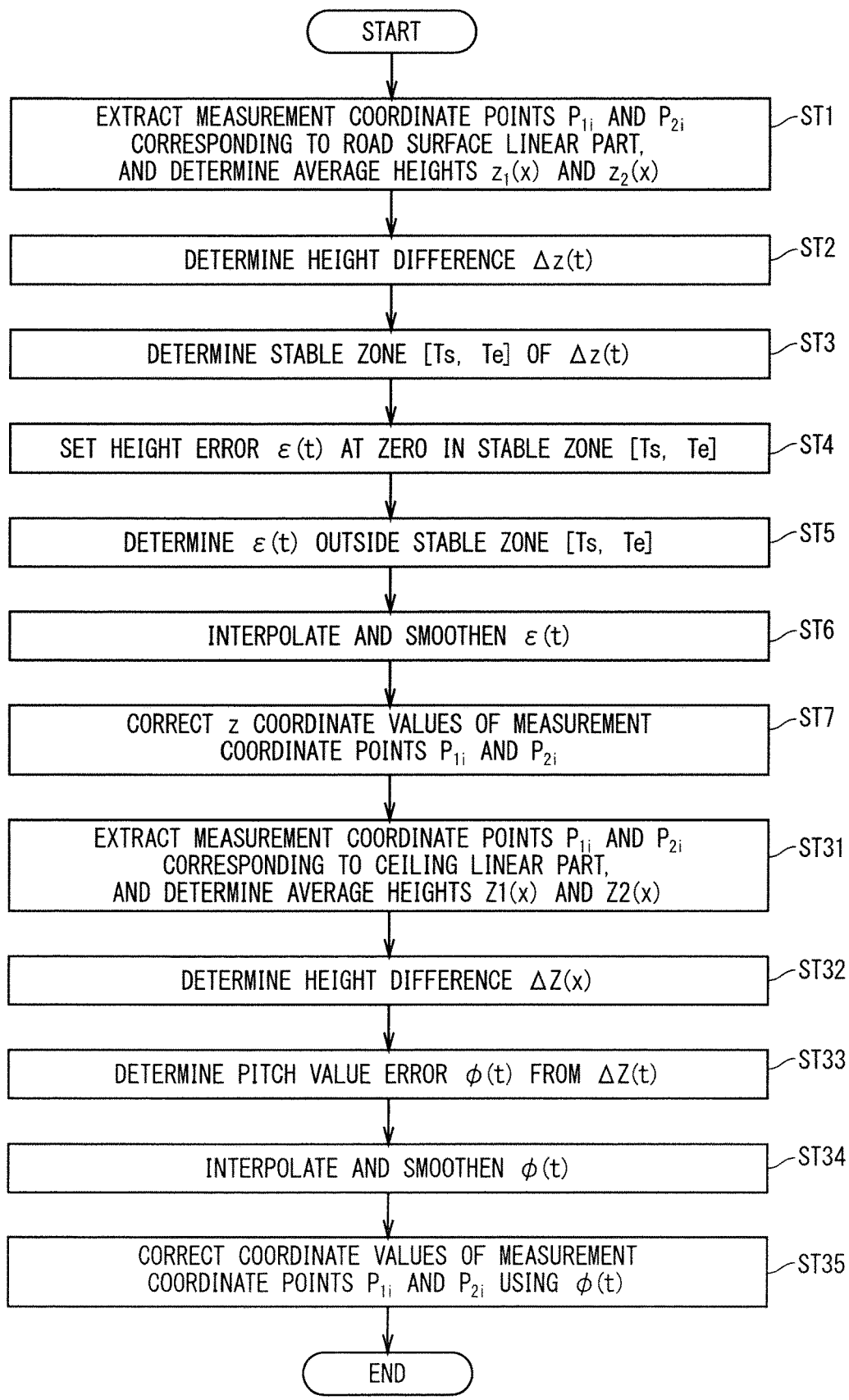
FIG. 25 is a flowchart showing operation of the structure measuring device according to the third embodiment of the present invention.

The following describes how the measurement point correcting device 17 performs the foregoing operation by referring to the measurement point correcting device 17 (FIG. 2) and the flowchart in FIG. 25. In this embodiment, after the height error $\varepsilon(t)$ is corrected by implementation of steps ST1 to ST7 in the same way as that in the first embodiment, the pitch error φ(t) is corrected. A similar step to that of the first embodiment 1 is identified by the same sign and will not be described.

In step ST31, the comparison part extracting unit 22 extracts measurement coordinate points corresponding to the linear part 34 on the ceiling section 33 of a tunnel wall surface, namely, the first upper linear point cloud 5D about each scanning from the measurement coordinate points $P_{1i}$ determined by the first laser scanner 14. Then, the representative height $Z_1(x)$ of the linear part 34 about each scanning is calculated. Likewise, measurement coordinate points corresponding to the linear part 34 on the ceiling section 33 of the tunnel wall surface, namely, the second upper linear point cloud 8D about each scanning is extracted from the measurement coordinate points $P_{2i}$ determined by the second laser scanner 15. Then, the representative height $Z_2(x)$ of the linear part 34 about each scanning is calculated.

In step ST32, the difference calculating unit 23 calculates the difference $\Delta Z(x)$ of $Z_2(x)-Z_1(x)$ meaning a difference between the representative height $Z_1(x)$ determined through measurement of the linear part 34 on the ceiling section 33 by the first laser scanner 14 and the representative height $Z_2(x)$ determined through measurement of the same linear part 34 by the second laser scanner 15.

In step ST33, the error calculating unit 24 calculates the pitch error φ(t) having time dependence included in the measurement coordinate point $P_{1i}$ and the measurement coordinate point $P_{2i}$ on the basis of the foregoing $\Delta Z(x)$. In step ST34, the error calculating unit 24 interpolates and smoothens the resultant φ(t).

In step ST35, the coordinate value correcting unit 25 corrects pitch error in the measurement coordinate points $P_{1i}$ determined by the first laser scanner 14 and pitch error in the measurement coordinate points $P_{2i}$ determined by the second laser scanner 15. Namely, the foregoing pitch error φ(t) is removed to determine a measurement coordinate point after correction of the pitch error.

In this embodiment, the pitch error φ(t) is calculated as error having time dependence included in the measurement coordinate point $P_{1i}$ and the measurement coordinate point $P_{2i}$. Correcting the pitch error φ(t) makes it possible to increase accuracy of a measurement coordinate point indicating the geometry of a surface of a structure.

For calculation of the pitch error φ(t), the first lower linear point cloud 5C, the first upper linear point cloud 5D, the second lower linear point cloud 8C, and the second upper linear point cloud 8D are calculated. By using results of these calculations, it becomes possible to calculate the pitch error φ(t) easily.

The method shown in FIG. 23 is an example of calculating pitch error. Meanwhile, a different method is applicable, as long as this different method is usable for calculating pitch error. For example, the difference calculating unit 23 (FIG. 2) may calculate a height between the first lower linear point cloud 5C and the first upper linear point cloud 5D shown in FIG. 20 and a height between the second lower linear point cloud 8C and the second upper linear point cloud 8D shown in FIG. 21. Pitch error may be calculated on the basis of shift of the latter height from the former height.

In the foregoing embodiment, the first laser scanner 14 having the first measurement surface 26 orthogonal to the front-back axis 27 of the measuring vehicle 1 and the second laser scanner 15 having the measurement surface 28 tilted frontward or backward from the vertical direction are used. However, the first laser scanner 14 and the second laser scanner 15 are not limited to these directions, as long as the first laser scanner 14 and the second laser scanner 15 are capable of measuring the same linear part on each of the road surface 3 and the ceiling section 33.

Fourth Embodiment

Figure 26:
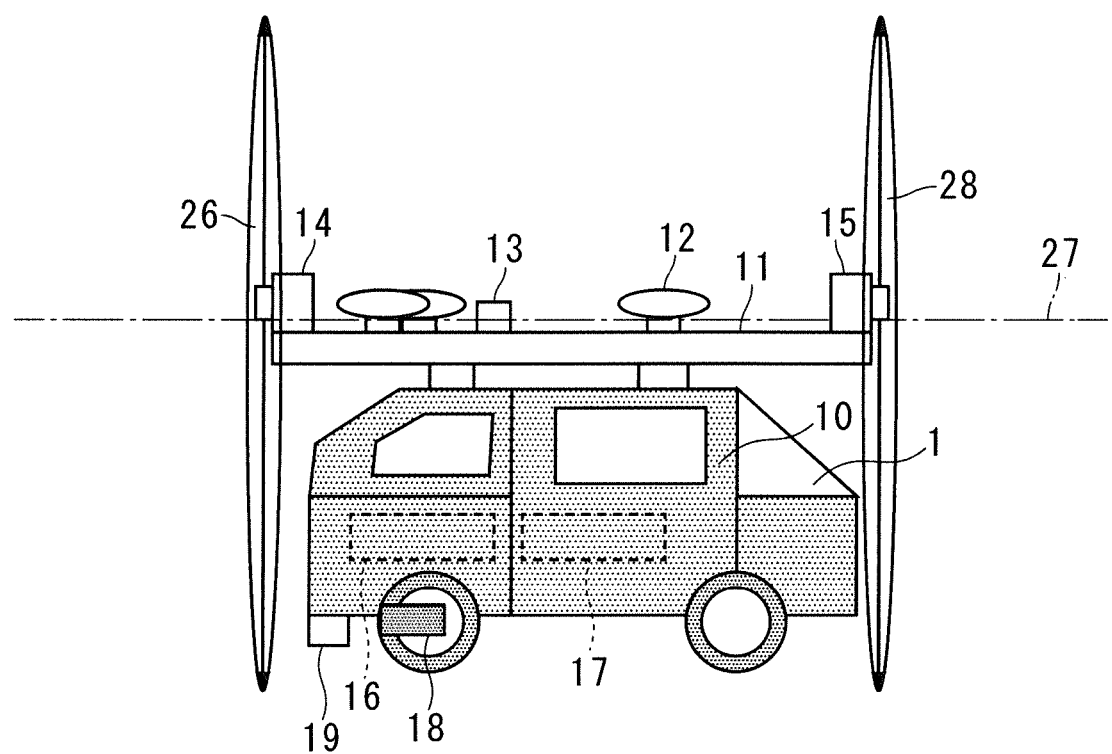
FIG. 26 is a side view showing an example of the configuration of a measuring vehicle provided with a structure measuring device according to a fourth embodiment of the present invention.

FIG. 26 is a side view showing an example of the configuration of the measuring vehicle 1 provided with a structure measuring device according to a fourth embodiment. This embodiment differs in the arrangement of the second laser scanner 15 from that in the configuration of the first embodiment 1 shown in FIG. 1 or those of its modifications. More specifically, the first measurement surface 26 of the first laser scanner 14 and the second measurement surface 28 of the second laser scanner 15 are parallel to each other. To be more specific, the first laser scanner 14 and the second laser scanner 15 are arranged in such a manner that not only the first measurement surface 26 of the first laser scanner 14 but also the second measurement surface 28 of the second laser scanner 15 is orthogonal to the front-back axis 27 of the measuring vehicle 1.

The first laser scanner 14 and the second laser scanner 15 are separated from each other in the direction of the front-back axis 27. Preferably, one of the first laser scanner 14 and the second laser scanner 15 is provided at the front of the measuring vehicle 1 and the other is at the back. In the illustration of the drawing, the first laser scanner 14 is arranged at the back of the measuring vehicle 1 and the second laser scanner 15 is arranged at the front. Like in the first embodiment, the first laser scanner 14 is preferably installed in a manner allowing measurement along an entire periphery of rotation of scanning, in other words, in all directions within the first measurement surface 26. Further, the second laser scanner 15 is preferably installed in a manner allowing measurement along an entire periphery of rotation of scanning, in other words, in all directions within the second measurement surface 28.

Figure 27:
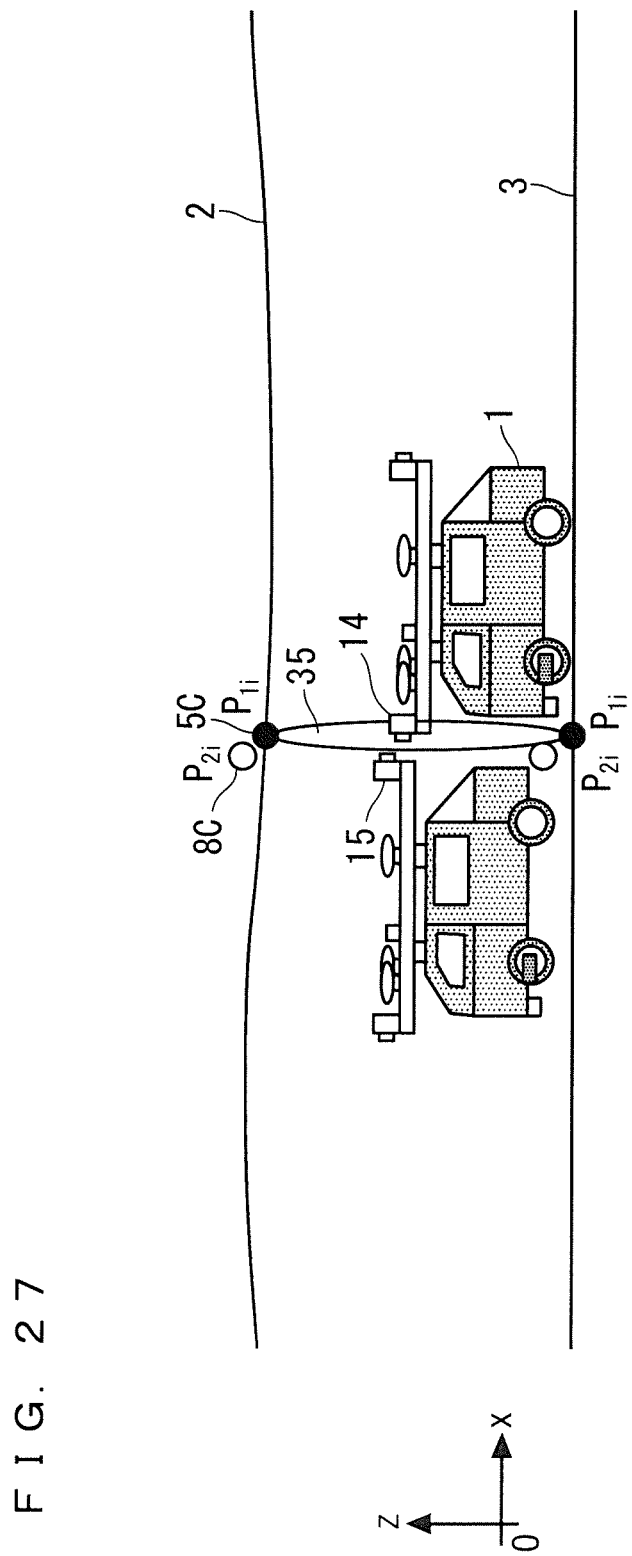
FIG. 27 is a side view explaining measurement coordinate points determined by a first point cloud sensor and a second point cloud sensor belonging to the structure measuring device according to the fourth embodiment of the present invention.

FIG. 27 is a side view explaining the measurement coordinate point $P_{1i}$ determined by the first laser scanner 14 and the measurement coordinate point $P_{2i}$ determined by the second laser scanner 15. If there is fine unevenness on the road surface 3, the measuring vehicle 1 may vibrate vertically and horizontally. If this changes at least one of the vertical position (namely, height) and the horizontal position of the measuring vehicle 1 more finely than a cycle of measurement by the position and attitude sensor, information from the position and attitude sensor is not sufficient for acquiring the position of the measuring vehicle 1 with high accuracy at every time t. This makes the height error ε(t) and horizontal error υ(t) not ignorable in a measured value from the laser scanner at the time t. More specifically, a measurement point at the time t to be measured by the laser scanner becomes a coordinate value increased in the top-down direction of the measuring vehicle 1, in other words, in the z direction corresponding to a tunnel height direction by ε(t) from a true coordinate value, and becomes a coordinate value increased in the right-left direction of the measuring vehicle 1, in other words, in the y direction corresponding to a tunnel width direction by υ(t) from a true coordinate value. According to this embodiment, the height error ε(y) and the horizontal error υ(t) of the measuring vehicle 1 are corrected.

To determine the height error ε(t) and the horizontal error υ(t), the first laser scanner 14 and the second laser scanner 15 continuously perform operations of measuring different sections simultaneously. By doing so, a single linear part 35 in a vertical section of the tunnel 2 (section vertical to the viewing angle of FIG. 27) is measured at different times by both the first laser scanner 14 and the second laser scanner 15. The height error ε(t) and the horizontal error υ(t) can be determined by comparing results of these measurements and can be corrected by using the results.

It is assumed that the first laser scanner 14 measures one linear part 35 as a comparison part at a time $t_1$. The linear part 35 is measured in a considerably short length of time, so that a time of measurement of a point at its center is treated as a representative time of measurement of the linear part 35. It is further assumed that the second laser scanner 15 measures the same linear part 35 at a time $t_2$. Strictly speaking, as described in the first embodiment, a region of scanning by the laser scanner has an interval on the road surface 3, so that the first laser scanner 14 and the second laser scanner 15 are generally not to sense the same line in a strict sense. As a result of a considerably short cycle of scanning, however, the first laser scanner 14 and the second laser scanner 15 can be considered to sense substantially the same line. Influence of vibration over the measuring vehicle 1 may differ between the time $t_1$ and the time $t_2$. In this case, a measurement result about the same linear part 35 differs between the first laser scanner 14 and the second laser scanner 15. More specifically, as a result of sensing of the common linear part 35, a linear point cloud 5C determined from the first laser scanner 14 and a linear point cloud 8C determined from the second laser scanner 15 differ from each other.

Figure 28:
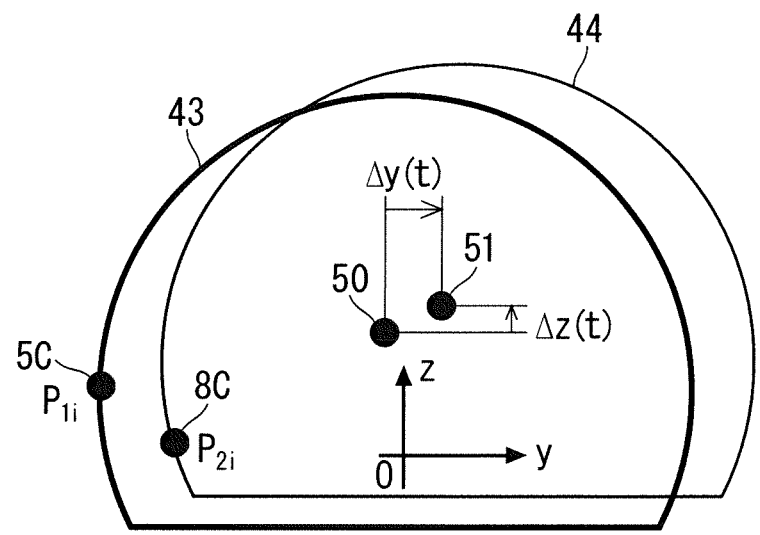
FIG. 28 is a side view explaining a method of calculating error in a measurement coordinate point during operation of the structure measuring device according to the fourth embodiment of the present invention.

Referring to FIG. 28, in this embodiment, a part on a surface of a structure around the first laser scanner 14 and corresponding to a line of intersection with the first measurement surface 26 (FIG. 26) is entirely a linear part. Likewise, a part on a surface of a structure around the second laser scanner 15 and corresponding to a line of intersection with the second measurement surface 28 (FIG. 26) is entirely a linear part. Both the first measurement surface 26 and the second measurement surface 28 are parallel to the yz plane to allow each of the first laser scanner 14 and the second laser scanner 15 to measure the same linear part. Even on the basis of the measurements of the same linear part, a shift resulting from the vibration of the measuring vehicle 1 can still be generated between a pattern 43 drawn on the yz plane by a group of the measurement coordinate point $P_{1i}$ determined by the first laser scanner 14 (namely, linear point cloud 5C) and a pattern 44 drawn on the yz plane by a group of the measurement coordinate point $P_{2i}$ determined by the second laser scanner 15 (namely, linear point cloud 8C). In this embodiment, this shift is evaluated.

It is assumed that the pattern 43 and the pattern 44 corresponding to the same linear part are measured at the time $t_1$ and the time $t_2$ respectively. The coordinates of a barycenter 50 of the pattern 43 within the yz plane are defined as $(y_{1c}(t_1), z_{1c}(t_1))$. The coordinates of a barycenter 51 of the pattern 44 within the yz plane are defined as $(y_{2c}(t_2), z_{2c}(t_2))$. Assuming a difference between the barycenter 50 and the barycenter 51 within the yz plane as $(\Delta y(t_1), \Delta z(t_1))$, the following definitions are given:

$$\Delta y(t_1) = y_{2c}(t_2) - y_{1c}(t_1); \text{ and}$$

$$\Delta z(t_1) = z_{2c}(t_2) - z_{1c}(t_1).$$

Meanwhile, $\Delta y(t_1)$ and $\Delta z(t_1)$ can be expressed as follows by using the height error ε(t) and the horizontal error υ(t):

$$\Delta y(t_1) = \upsilon(t_2) - \upsilon(t_1); \text{ and}$$

$$\Delta z(t_1) = \varepsilon(t_2) - \varepsilon(t_1).$$

In this way, the function υ(t) and the function ε(t) can be calculated from each of Δy(t) and Δz(t). The function ε(t) is determined by the same method as that described in the first embodiment, The function υ(t) can be determined by the same algorithm. These will be described in detail below.

A zone [Tys, Tye] of the time t is extracted using the function Δy(t) in which Δy(t)=0 is established for a length of time sufficiently longer than a difference between lengths of time when the first laser scanner 14 and the second laser scanner 15 measure the same linear part. This zone is also called a stable zone about Δy(t). In the stable zone, the horizontal error υ(t) does not change. Thus, the horizontal error υ(t) is represented by a constant in the stable zone. Meanwhile, for the same reason as that for regarding the error ε(t) as zero in the first embodiment, υ(t) can be regarded as zero (Trs≤t≤Tre). The function υ(t) is determined by the same method as that for determining the function ε(t). More specifically, $\upsilon(t_2)$ is calculated as $\upsilon(t_1) + \Delta y(t_1)$ on the basis of $\upsilon(t_1)=0$ in a range of Tys≤$t_1$≤Tye. Further, $\upsilon(t_1)$ is calculated as $\upsilon(t_2) - \Delta y(t_1)$ on the basis of $\upsilon(t_2)=0$ in a range of Tys≤$t_2$≤Tye.

By using the foregoing algorithm, the function υ(t) can be determined in a range covering an entire measurement zone in the tunnel 2. Like in the case of the function ε(t), multiple stable zones may be selected and the function υ(t) may be determined in front of and behind each of the stable zones. The resultant function υ(t) may be subjected to filtering process such as smoothing for noise reduction.

Figure 29:
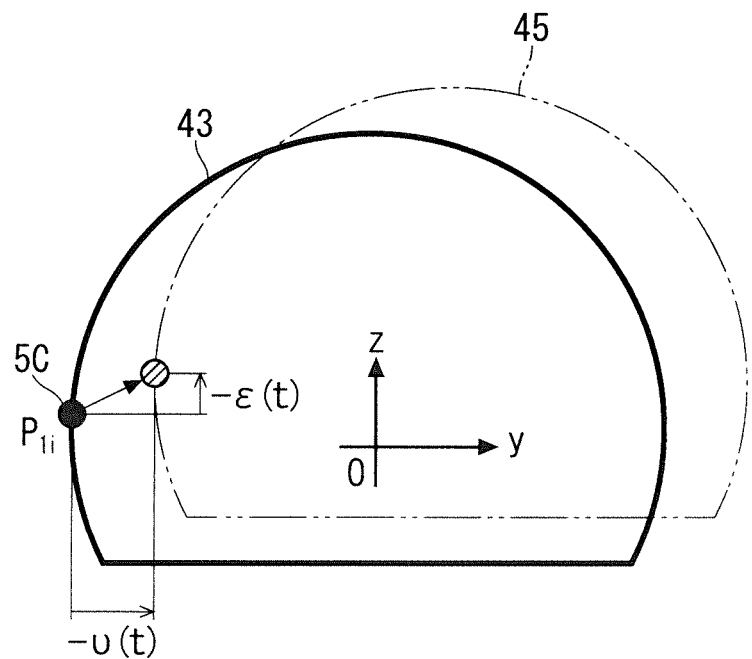
FIG. 29 is a front view explaining a method of correcting height error and horizontal error in a measurement coordinate point during operation of the structure measuring device according to the fourth embodiment of the present invention.

FIG. 29 is a front view explaining a method of correcting height error and horizontal error in the measurement coordinate point $P_{1i}$ determined by the first laser scanner 14. As the height error ε(t) and the horizontal error υ(t) are calculated by the foregoing method, the correction is made to remove these errors from each measurement coordinate point $P_{1i}$ determined by the first laser scanner 14. A y coordinate value about the measurement coordinate point $P_{1i}$ determined by the first laser scanner 14 is corrected as follows:

$$y_{1i} \leftarrow y_{1i} - \upsilon(\tau_{1i}).$$

Further, an x coordinate is corrected to correct the measurement coordinate point $P_{1i}$. Each measurement coordinate point $P_{1i}$ is corrected to modify the pattern 43 to a pattern 45.

Likewise, the y coordinate of the measurement coordinate point $P_{2i}$ determined by the second laser scanner 15 is corrected as follows:

$$y_{2i} \leftarrow y_{2i} - \upsilon(\tau_{2i}).$$

Further, an x coordinate is corrected to correct the measurement coordinate point $P_{2i}$.

As a result of the foregoing operations, correction of the measurement coordinate points is finished.

Figure 30:
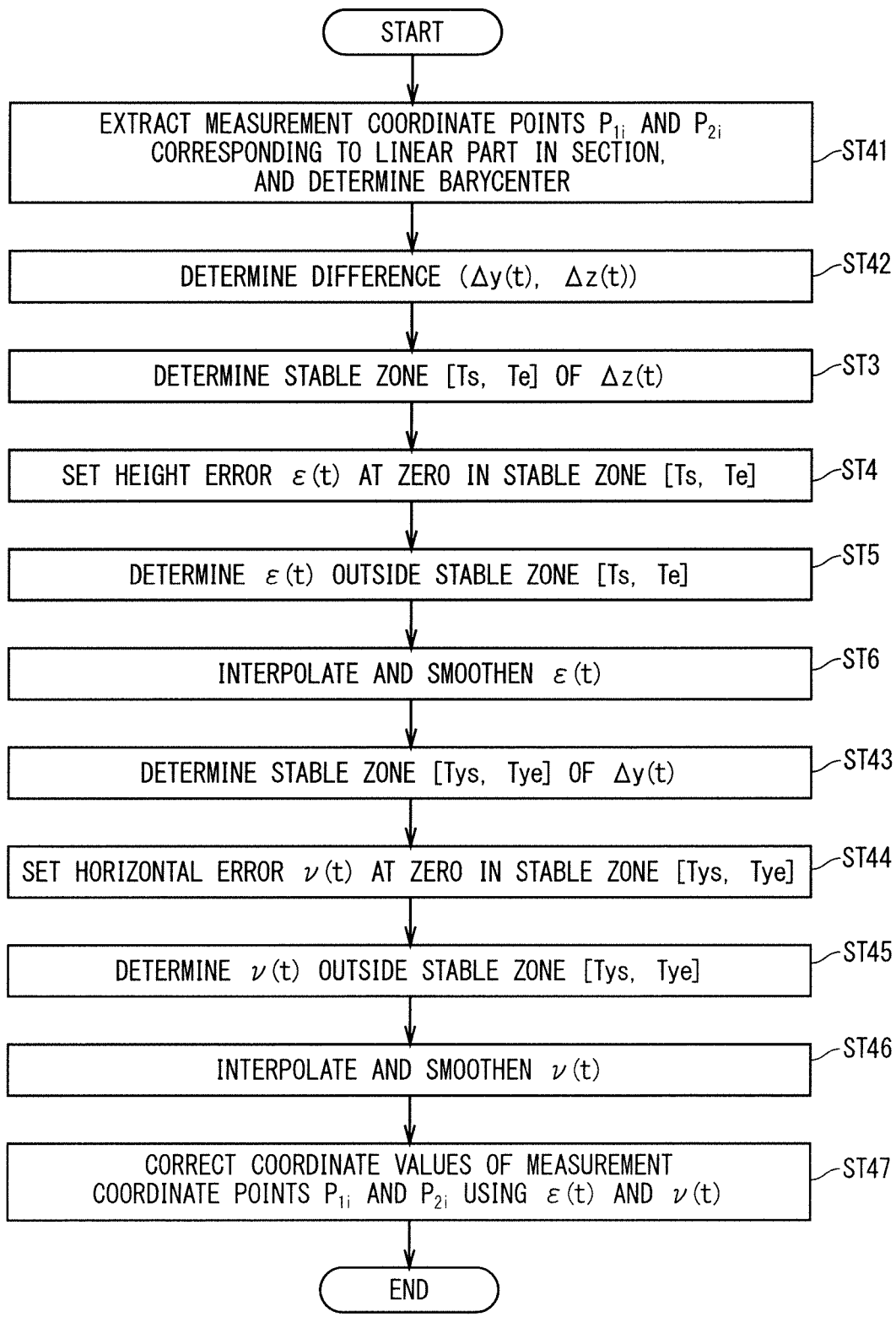
FIG. 30 is a flowchart showing operation of the structure measuring device according to the fourth embodiment of the present invention.

The following describes how the measurement point correcting device 17 performs the foregoing operation by referring to the measurement point correcting device 17 (see FIG. 2) and the flowchart in FIG. 30.

In step ST41, the comparison part extracting unit 22 extracts measurement coordinate points (first linear point cloud) corresponding to the linear part 35 (linear part in section) measured through one scanning for measuring a section of the tunnel 2 entirely, namely, through scanning by one rotation of the first laser scanner 14 from the measurement coordinate points $P_{1i}$ determined by the first laser scanner 14. Then, the coordinate of the barycenter 50 of the pattern 43 drawn by the extracted measurement coordinate points in each scanning is calculated. The same method is implemented to calculate the coordinate of the barycenter 51 of the pattern 44 about the second laser scanner 15.

In step ST42, the difference calculating unit 23 calculates a difference between the barycenter 50 of the pattern 43 acquired through measurement of the linear part 35 in a section and the barycenter 51 of the pattern 44 acquired through measurement of the same linear part 35 as a function ($\Delta y(t)$, $\Delta z(t)$) about the time t of measurement by the first laser scanner 14.

Next, steps ST3 to ST6 are performed in the same way as that in the first embodiment. As a result, the function 40 is determined.

In step ST43, the error calculating unit 24 extracts the stable zone [Tys, Tye] as a zone of the time t in which the function $\Delta y(t)$ has a value of substantially zero. In step ST44, the error calculating unit 24 sets the function $\upsilon(t)$ at a value of zero about the time t in the stable zone [Tys, Tye].

In step ST45, the error calculating unit 24 performs operation of adding $\Delta \upsilon(t)$ to $\upsilon(t)$ on the basis of $\upsilon(t)=0$ about the time t in the stable zone [Tys, Tye], thereby determining $\upsilon(t+\Delta t)$. Further, the error calculating unit 24 performs operation of adding $-\Delta \upsilon(t)$ $(t-\Delta t)$ to $\upsilon(t)$, thereby determining $\upsilon(t-\Delta t)$. Such operations are repeated to calculate the horizontal error $\upsilon(t)$ having time dependence included in the measurement coordinate point $P_{1i}$ and the measurement coordinate point $P_{2i}$ for a range covering all the required times t. In step ST46, the error calculating unit 24 interpolates and smoothens the resultant function $\upsilon(t)$.

In step ST47, the coordinate value correcting unit 25 corrects height error and vertical error in each of the measurement coordinate point $P_{1i}$ determined by the first laser scanner 14 and the measurement coordinate point $P_{2i}$ determined by the second laser scanner 15. More specifically, the height error $\varepsilon(\tau_{1i})$ occurring at the time of measurement of the measurement coordinate point $P_{1i}$ is subtracted from the z coordinate of this measurement coordinate point $P_{1i}$, and the horizontal error $\upsilon(\tau_{1i})$ occurring at the time of measurement of the measurement coordinate point $P_{1i}$ is subtracted from the y coordinate of this measurement coordinate point $P_{1i}$. Likewise, the height error $\varepsilon(\tau_{1i})$ occurring at the time of measurement of the measurement coordinate point $P_{2i}$ is subtracted from the z coordinate of this measurement coordinate point $P_{2i}$, and the horizontal error $\upsilon(\tau_{2i})$ occurring at the time of measurement of the measurement coordinate point $P_{2i}$ is subtracted from the y coordinate of this measurement coordinate point $P_{2i}$.

As a result of the foregoing, height error and horizontal error in the measurement coordinate points determined by the first laser scanner 14 and the second laser scanner 15 are corrected.

According to this embodiment, the first measurement surface 26 of the first laser scanner 14 and the second measurement surface 28 of the second laser scanner 15 are parallel to each other. This makes it possible to set a wide range of a linear part to be scanned by both the first laser scanner 14 and the second laser scanner 15. Thus, measurement error can be corrected with higher accuracy. This range can be set along an entire periphery of a measurement surface at a maximum, and this can increase accuracy in the correction to a greater extent.

As shown in FIG. 28, the barycenter 50 of the pattern 43 drawn by a first linear part and the barycenter 51 of the pattern 44 drawn by a second linear part are calculated. By using results of these calculations, error in a plane parallel to a measurement surface can be calculated easily.

The vertical error $\varepsilon(t)$ is calculated as error having time dependence included in the measurement coordinate point $P_{1i}$ and the measurement coordinate point $P_{2i}$. By correcting the calculated vertical error $\varepsilon(t)$, it becomes possible to provide a measurement coordinate point indicating the geometry of a surface of a structure with higher accuracy. Further, the horizontal error $\upsilon(t)$ is calculated as error having time dependence included in the measurement coordinate point $P_{1i}$ and the measurement coordinate point $P_{2i}$. By correcting the calculated horizontal error $\upsilon(t)$, it becomes possible to provide a measurement coordinate point indicating the geometry of a surface of a structure with higher accuracy. Correcting both the vertical error $\varepsilon(t)$ and the horizontal error $\upsilon(t)$ makes it possible to increase the accuracy of a measurement coordinate point within a plane vertical to the front-back axis 27 (FIG. 26) to a greater extent.

The first laser scanner 14 and the second laser scanner 15 are installed at the back and the front of the measuring vehicle 1 respectively (see FIG. 26). This prevents both of the respective measurement surfaces from crossing the measuring vehicle 1, allowing both of the laser scanners to measure all vertical sections in the tunnel 2. If the measurement surface of one of the laser scanners crosses the measuring vehicle 1 or the other laser scanner to prohibit measurement of a part of a section and if this does not cause any problem, a method of installing the first laser scanner 14 and the second laser scanner 15 is not limited to that described above.

The roll error $\rho(t)$ may be corrected further by combining the foregoing second embodiment with this embodiment. The pitch error $\varphi(t)$ may be corrected further by combing the foregoing third embodiment with this embodiment. In this embodiment, the horizontal error $\upsilon(t)$ is determined using a measurement coordinate point corresponding to a linear part in a section. Alternatively, a measurement coordinate point corresponding to a partially linear part in a section such as the road surface 3 or the ceiling section 33 described in the foregoing third embodiment may be extracted, and the horizontal error $\upsilon(t)$ may be determined using the extracted measurement coordinate point.

In each of the foregoing embodiments, the coordinates of measurement coordinate points determined by the first laser scanner 14 and the second laser scanner 15 are corrected. Alternatively, a coordinate value about the vehicle position Q(t) of the measuring vehicle 1 may be corrected. The coordinate value about the vehicle position Q(t) at the time t is defined as (qx(t), qy(t), qz(t)). Then, the z coordinate can be corrected as follows:

$$qz(t) \leftarrow qz(t) - \varepsilon(t).$$

If $\upsilon(t)$ is also known, the y coordinate can be corrected as follows:

$$qy(t) \leftarrow qy(t) - \upsilon(t).$$

If the attitude of the measuring vehicle 1 is also measured, a roll value and a pitch value about the attitude may be corrected using $\rho(t)$ and $\varphi(t)$ respectively.

Figure 31:
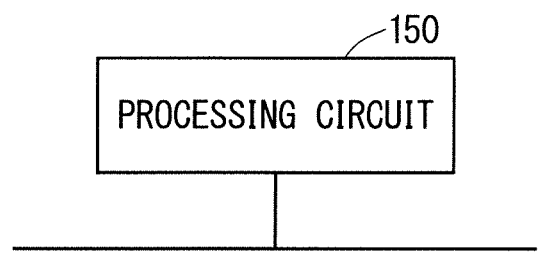
FIG. 31 shows an example of a hardware configuration of each element in a measurement coordinate point calculating unit and a measurement point correcting device according to each of the embodiments of the present invention.
Figure 32:
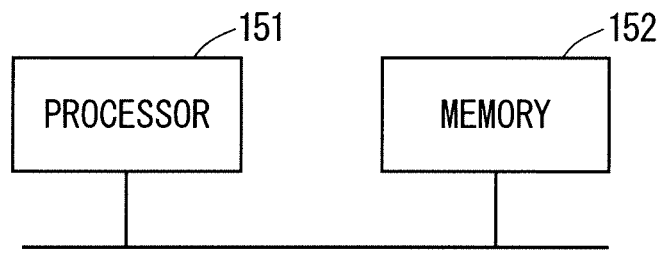
FIG. 32 shows an example of a hardware configuration of each element in the measurement coordinate point calculating unit and the measurement point correcting device according to each of the embodiments of the present invention.

Each element in the measurement coordinate point calculating unit 16 and the measurement point correcting device 17 (FIG. 2) is realized by a processing circuit 150 shown in FIG. 31, for example. The processing circuit 150 may be dedicated hardware, or may be a processor (central processing unit (CPU)), a central processor, a processing device, an arithmetic device, a microprocessor, a microcomputer, or a digital signal processor (DSP) to execute a program stored in a memory. If the processing circuit 150 is dedicated hardware, the processing circuit 150 corresponds to a single circuit, a complex circuit, a programmed processor, a parallel-programmed processor, an application specific integrated circuit (ASIC), a field-programmable gate array (FPGA), or a combination of these units, for example. The function of each element in the measurement coordinate point calculating unit 16 and the measurement point correcting device 17 may be realized by multiple processing circuits. Alternatively, all these functions may be realized together in one processing circuit. FIG. 32 shows the hardware configuration of the measurement coordinate point calculating unit 16 and the measurement point correcting device 17 determined when the processing circuit 150 is configured using a processor. In this case, the function of each element in the measurement coordinate point calculating unit 16 and the measurement point correcting device 17 is realized by combination with software, etc. (software, firmware, or software and firmware). Such software is described as a program and stored into a memory 152. A processor 151 functioning as the processing circuit 150 reads the program from the memory 152 and executes the read program, thereby realizing the function of each part. In other words, this program can be considered to be a program for causing a computer to implement a procedure or a method of operation of each element in the measurement coordinate point calculating unit 16 and the measurement point correcting device 17. Various types of storage media correspond to the memory 152 including a nonvolatile or volatile semiconductor memory such as a random access memory (RAM), a read only memory (ROM), a flash memory, an erasable programmable read only memory (EPROM) or an electrically erasable programmable read only memory (EEPROM), a hard disk drive (HDD), a magnetic disk, a flexible disk, an optical disk, a compact disk, a minidisk, a digital versatile disc (DVD), and drivers thereof. In the foregoing configuration, the function of each element in the measurement coordinate point calculating unit 16 and the measurement point correcting device 17 is realized by one of hardware and software, etc. However, this is not the limited configuration but some of the elements in the measurement coordinate point calculating unit 16 and the measurement point correcting device 17 may be realized by dedicated hardware, and other elements thereof may be realized by software, etc. For example, the functions of some of the elements can be realized by the processing circuit 150 as dedicated hardware, and the functions of other elements can be realized by reading of the program from the memory 152 and execution of the read program by the processing circuit 150 as the processor 151. As described above, each of the foregoing functions of the measurement coordinate point calculating unit 16 and that of the measurement point correcting device 17 can be realized by hardware, software, etc. or combination of hardware and software, etc.

The present invention is feasible by combining all the embodiments freely, or if appropriate, by modifying or omitting each embodiment within the scope of the invention. While the invention has been shown and described in detail, the foregoing description is in all aspects illustrative and not restrictive. It is therefore understood that numerous modifications not shown can be devised without departing from the scope of the invention.

EXPLANATION OF REFERENCE SIGNS

4, 7, 9, 34, 35 Linear part
1 Measuring vehicle
2 Tunnel
3 Road surface
5, 8 Measurement point
5C Linear point cloud (first lower linear point cloud)
5D First upper linear point cloud
8C Linear point cloud (second lower linear point cloud)
8D Second upper linear point cloud
10 Body
11 Top plate
12 GPS receiver
13 Inertial sensor
14 First laser scanner (first point cloud sensor)
15 Second laser scanner (second point cloud sensor)
16 Measurement coordinate point calculating unit
17 Measurement point correcting device
18 Odometer
19 Speed detector
20 Point cloud data
21 Storage unit
22 Comparison part extracting unit
23 Difference calculating unit
24 Error calculating unit
25 Coordinate value correcting unit
26 First measurement surface
27 Front-back axis
28 Second measurement surface
33 Ceiling section
150 Processing circuit
151 Processor
152 Memory

The invention claimed is:

1. A structure measuring device that measures the geometry of a surface of a structure around a measuring vehicle, comprising:

a position and attitude sensor that senses the position and attitude of the measuring vehicle;

a first point cloud sensor that senses relative positions of multiple first measurement points from the measuring vehicle by scanning the interior of a first measurement surface traveling together with the measuring vehicle;

a second point cloud sensor that senses relative positions of multiple second measurement points from the measuring vehicle by scanning the interior of a second measurement surface traveling together with the measuring vehicle and differing from the first measurement surface;

a measurement coordinate point calculator that calculates multiple first measurement coordinate points forming a three-dimensional point cloud representing the multiple first measurement points on the basis of the relative positions of the multiple first measurement points sensed by the first point cloud sensor and an estimated position and attitude the measuring vehicle has at a time when each of the multiple first measurement points is sensed, and calculates multiple second measurement coordinate points forming a three-dimensional point cloud representing the multiple second measurement points on the basis of the relative positions of the multiple second measurement points sensed by the second point cloud sensor and an estimated position and attitude the measuring vehicle has at a time when each of the multiple second measurement points is sensed;

a storage that stores the multiple first measurement coordinate points and the multiple second measurement coordinate points together with respective measurement times;

a comparison part extractor that extracts a first comparison point cloud representing a comparison part on the surface of the structure from the multiple first measurement coordinate points stored in the storage, and extracts a second comparison point cloud representing a comparison part on the surface of the structure from the multiple second measurement coordinate points stored in the storage;

a difference calculator that calculates a difference between the first comparison point cloud and the second comparison point cloud corresponding to measurement of a common comparison part on the surface of the structure;

an error calculator that calculates error having time dependence included in the multiple first measurement coordinate points and the multiple second measurement coordinate points on the basis of the difference calculated by the difference calculator; and a coordinate value corrector that corrects at least either the multiple first measurement coordinate points or the multiple second measurement coordinate points on the basis of the error calculated by the error calculator.

2. The structure measuring device according to claim 1, wherein a normal vector to each of the first measurement surface of the first point cloud sensor and the second measurement surface of the second point cloud sensor has a component of zero along a right-left axis of the measuring vehicle.

3. The structure measuring device according to claim 2, wherein the first measurement surface of the first point cloud sensor is orthogonal to a front-back axis of the measuring vehicle.

4. The structure measuring device according to claim 3, wherein the normal vector to the second measurement surface of the second point cloud sensor is tilted 30 degrees from the front-back axis of the measuring vehicle.

5. The structure measuring device according to claim 1, wherein the error calculator calculates at least height error as the error having time dependence included in the multiple first measurement coordinate points and the multiple second measurement coordinate points.

6. The structure measuring device according to claim 5, wherein the difference calculator calculates a difference between the height of the first comparison point cloud and the height of the second comparison point cloud.

7. The structure measuring device according to claim 1, wherein the error calculator calculates at least roll error as the error having time dependence included in the multiple first measurement coordinate points and the multiple second measurement coordinate points.

8. The structure measuring device according to claim 7, wherein the comparison part extractor calculates a tilt of an approximate straight line of the first comparison point cloud and a tilt of an approximate straight line of the second comparison point cloud.

9. The structure measuring device according to claim 1, wherein the error calculator calculates at least pitch error as the error having time dependence included in the multiple first measurement coordinate points and the multiple second measurement coordinate points.

10. The structure measuring device according to claim 9, wherein the comparison part extractor extracts a first lower comparison point cloud and a first upper comparison point cloud as the first comparison point cloud, and extracts a second lower comparison point cloud and a second upper comparison point cloud as the second comparison point cloud.

11. The structure measuring device according to claim 1, wherein the first measurement surface of the first point cloud sensor and the second measurement surface of the second point cloud sensor are parallel to each other.

12. The structure measuring device according to claim 11, wherein the comparison part extractor calculates a barycenter of a pattern drawn by the first comparison point cloud and a barycenter of a pattern drawn by the second comparison point cloud.

13. The structure measuring device according to claim 11, wherein the error calculator calculates at least horizontal error as the error having time dependence included in the multiple first measurement coordinate points and the multiple second measurement coordinate points.

14. A measurement point correcting device that corrects at least either multiple first measurement coordinate points or multiple second measurement coordinate points indicating the geometry of a surface of a structure acquired by scanning the interior of a first measurement surface and scanning the interior of a second measurement surface, respectively, the first measurement surface and the second measurement surface maintaining a relative positional relationship and traveling together, the measurement point correcting device comprising:

a comparison part extractor that extracts a first comparison point cloud representing a comparison part on the surface of the structure from the multiple first measurement coordinate points, and extracts a second comparison point cloud representing a comparison part on the surface of the structure from the multiple second measurement coordinate points;

a difference calculator that calculates a difference between the first comparison point cloud and the second comparison point cloud corresponding to measurement of a common comparison part on the surface of the structure;

an error calculator that calculates error having time dependence included in the multiple first measurement coordinate points and the multiple second measurement coordinate points on the basis of the difference calculated by the difference calculator; and a coordinate value corrector that corrects at least either the multiple first measurement coordinate points or the multiple second measurement coordinate points on the basis of the error calculated by the error calculator.

15. A measurement point correcting method that corrects at least either multiple first measurement coordinate points or multiple second measurement coordinate points indicating the geometry of a surface of a structure acquired by scanning the interior of a first measurement surface and scanning the interior of a second measurement surface, respectively, the first measurement surface and the second measurement surface maintaining a relative positional relationship and traveling together, the measurement point correcting method comprising:

extracting a first comparison point cloud representing a comparison part on the surface of the structure from the multiple first measurement coordinate points, and extracting a second comparison point cloud representing a comparison part on the surface of the structure from the multiple second measurement coordinate points;
calculating a difference between the first comparison point cloud and the second comparison point cloud corresponding to measurement of a common comparison part on the surface of the structure;
calculating error having time dependence included in the multiple first measurement coordinate points and the multiple second measurement coordinate points on the basis of the difference; and
correcting at least either the multiple first measurement coordinate points or the multiple second measurement coordinate points on the basis of the error.

* * * * *